(12) United States Patent
Iijima et al.

(10) Patent No.: US 8,043,671 B2
(45) Date of Patent: Oct. 25, 2011

(54) LIQUID-CRYSTALLINE MEDIUM AND LIQUID CRYSTAL DISPLAY

(75) Inventors: Masahiro Iijima, Zama (JP); Nobuo Kubo, Atsugi (JP)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 12/608,251

(22) Filed: Oct. 29, 2009

(65) Prior Publication Data

US 2010/0108945 A1 May 6, 2010

(30) Foreign Application Priority Data

Oct. 30, 2008 (EP) .................................... 08018955

(51) Int. Cl.
*C09K 19/30* (2006.01)
*C09K 19/12* (2006.01)
*C09K 19/32* (2006.01)

(52) U.S. Cl. ................ 428/1.1; 252/299.62; 252/299.63; 252/299.66

(58) Field of Classification Search .................... 428/1.1; 252/299.62, 299.63, 299.66
See application file for complete search history.

(56) References Cited

U.S. PATENT DOCUMENTS

| | | |
|---|---|---|
| 5,702,640 A | 12/1997 | Junge et al. |
| 6,638,581 B2 * | 10/2003 | Heckmeier et al. ............ 428/1.1 |
| 6,929,834 B2 * | 8/2005 | Klasen-Memmer et al. .. 428/1.1 |
| 2006/0278849 A1 * | 12/2006 | Suzuki et al. ............ 252/299.61 |
| 2009/0309066 A1 | 12/2009 | Klasen-Memmer et al. |

FOREIGN PATENT DOCUMENTS

| | | |
|---|---|---|
| DE | 4444813 A1 | 2/1996 |
| DE | 4444813 W | 2/1996 |
| EP | 09012968 R | 11/2009 |
| WO | 2008009417 A1 | 1/2008 |

* cited by examiner

*Primary Examiner* — Shean Wu
(74) *Attorney, Agent, or Firm* — Millen, White, Zelano & Branigan, P.C.

(57) ABSTRACT

Disclosed are a liquid-crystalline medium based on a mixture of dielectrically negative polar compounds of each of formulae I and II

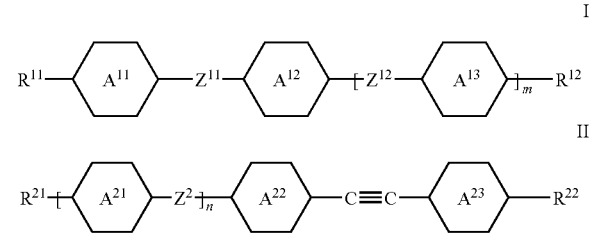

and the use thereof in an electro-optical display, particularly in a display with passive matrix addressing, based on a VA, ECB, PALC, FFS or IPS effect, and such displays.

20 Claims, No Drawings

LIQUID-CRYSTALLINE MEDIUM AND LIQUID CRYSTAL DISPLAY

The present invention relates to liquid-crystal media and to the use thereof in liquid-crystal displays, and to these liquid-crystal displays, particularly liquid-crystal displays which use the ECB (electrically controlled birefringence) effect with dielectrically negative liquid crystals in a homeotropic starting alignment. The liquid-crystal media according to the invention are distinguished by a particularly short response time in the displays according to the invention at the same time a high voltage holding ratio.

Displays which use the ECB effect have become established as so-called VAN (vertically aligned nematic) displays, for example in the MVA (multi-domain vertical alignment, for example: Yoshide, H. et al., Paper 3.1: "MVA LCD for Notebook or Mobile PCs . . . ", SID 2004 International Symposium, Digest of Technical Papers, XXXV, Book I, pp. 6 to 9 and Liu, C. T. et al., Paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, Paper 15.4: "Super PVA Sets New State-of-the-Art for LCD-TV", SID 2004 International Symposium, Digest of Technical Papers, XXXV, Book II, pp. 760 to 763) designs, ASV (advanced super view, for example: Shigeta, Mitzuhiro and Fukuoka, Hirofumi, Paper 15.2: "Development of High Quality LCD TV", SID 2004 International Symposium, Digest of Technical Papers, XXXV, Book II, pp. 754 to 757) displays, besides IPS (in-plane switching) displays (for example: Yea, S. D., Paper 15.3: "A LC Display for the TV Application", SID 2004 International Symposium, Digest of Technical Papers, XXXV, Book II, pp. 758 & 759), and the long-known displays, as one of the three more recent types of liquid-crystal display that are currently the most important besides TN (twisted nematic) displays, in particular for television applications. In general form, the technologies are compared, for example, in Souk, Jun, SID Seminar 2004, Seminar M-6: "Recent Advances in LCD Technology", Seminar Lecture Notes, M-6/1 to M-6/26, and Miller, Ian, SID Seminar 2004, Seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., Paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular in the switching of grey shades, is still a problem which has not yet been solved to a satisfactory extent.

ECB displays, like ASV displays, use liquid-crystalline media of negative dielectric anisotropy ($\Delta \in$), whereas TN and to date all conventional IPS displays use liquid-crystalline media of positive dielectric anisotropy.

In liquid-crystal displays of this type, the liquid crystals are used as dielectrics, whose optical properties change reversibly on application of an electrical voltage.

Since in displays in general, i.e. also in displays in accordance with these mentioned effects, the operating voltage should be as low as possible, use is made of liquid-crystal media which are generally predominantly composed of liquid-crystal compounds, all of which have the same sign of the dielectric anisotropy and have the largest possible absolute value of the dielectric anisotropy. In general, at most relatively small proportions of neutral compounds and if possible no compounds having the opposite sign of the dielectric anisotropy to the medium are employed. In the case of liquid-crystal media of negative dielectric anisotropy for ECB displays, predominantly compounds of negative dielectric anisotropy are thus employed. The liquid-crystal media employed generally consist predominantly and usually even essentially of liquid-crystal compounds of negative dielectric anisotropy.

In the media according to the present application, at most significant amounts of dielectrically neutral liquid-crystal compounds and generally only very small amounts of dielectrically positive compounds or even none at all are typically employed, since in general the liquid-crystal displays are intended to have the lowest possible addressing voltages.

The principle of electrically controlled birefringence, the ECB (electrically controlled birefringence) effect or DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). Papers by J. F. Kahn (Appl. Phys. Lett. 20 (1972), 1193) and G. Labrunie and J. Robert (J. Appl. Phys. 44 (1973), 4869) followed.

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy $\Delta n$ and values for the dielectric anisotropy $\Delta \in$ of $\leq -0.5$ in order to be suitable for use for high-information display elements based on the ECB effect. Electro-optical display elements based on the ECB effect have a homeotropic edge alignment (VA technology=vertically aligned). Dielectrically negative liquid-crystal media can also be used in displays which use the so-called IPS effect.

Industrial application of this effect in electro-optical display elements requires LC phases which have to meet a multiplicity of requirements. Particularly important here are chemical resistance to moisture, air and physical influences, such as heat, radiation in the infrared, visible and ultraviolet regions, and direct and alternating electric fields.

Furthermore, LC phases which can be used industrially are required to have a liquid-crystalline mesophase in a suitable temperature range and low viscosity.

None of the series of compounds having a liquid-crystalline mesophase that have been disclosed hitherto includes a single compound which meets all these requirements. Mixtures of two to 25 compounds, preferably of three to 18 compounds, are therefore generally prepared in order to obtain substances which can be used as LC phases. However, it has not been possible to prepare optimum phases easily in this manner, since no liquid-crystal materials having significantly negative dielectric anisotropy and adequate long-term stability have hitherto been available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:

1. MOS (metal oxide semiconductor) transistors on a silicon wafer as substrate.
2. Thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred here, the electro-optical effect used to date was predominantly the TN effect.

A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counter electrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays most used hitherto usually operate as TN cells with crossed polarisers in transmission and are back-lit. For TV applications, displays containing IPS cells or ECN (or VAN) cells have recently been used to an increased extent.

The term MLC displays here covers any matrix display with integrated non-linear elements, i.e. besides the active matrix also displays with passive elements, such as varistors or diodes (MIM=metal-insulator-metal).

MLC displays of this type are particularly suitable for TV applications (for example pocket televisions) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

The disadvantages of the MLC-TN displays disclosed hitherto are their comparatively low contrast, the relatively high viewing-angle dependence and the difficulty of producing grey shades in these displays.

There thus continues to be a great demand for MLC displays having very high specific resistance at the same time as a wide operating-temperature range, short response times and a low threshold voltage with the aid of which various grey shades can be produced.

The invention has the object of providing MLC displays, not only for monitor and TV applications, but also for mobile telephones and navigation systems, which are based on the ECB or IPS effect, do not have the disadvantages indicated above, or only do so to a lesser extent, and at the same time have very high specific resistance values. In particular, it must be ensured for mobile telephones and navigation systems that they also work at extremely high and extremely low temperatures.

The liquid-crystal media of the prior art having correspondingly low addressing voltages have relatively low electrical resistance values or a low voltage holding ratio and result in undesirably high power consumptions in the displays.

In addition, the addressing voltage of the displays of the prior art is often too great, in particular for displays which are not connected directly or not continuously to the power supply network, such as, for example, displays for mobile applications.

In addition, the phase range must be sufficiently broad for the intended application.

In particular, the response times of the liquid-crystal media in the displays must be improved i.e. reduced. This is particularly important for displays for television or multimedia applications. In order to improve the response times, it has repeatedly been proposed in the past to optimise the rotational viscosity of the liquid-crystal media ($\gamma_1$), i.e. to achieve media having the lowest possible rotational viscosity. However, the results achieved here are inadequate for many applications and therefore make it appear desirable to find further optimisation approaches.

There is therefore a great demand for liquid-crystal media which do not have the disadvantages of the media from the prior art, or at least do so to a significantly reduced extent.

Displays which use the ECB effect are realized either with active matrix addressing (AM) or, recently again, with passive matrix (PM) addressing. Especially for the latter improved liquid crystal materials are required. In particular lower threshold voltages, higher clearing points and higher birefringence values are required.

Compounds of the formula I are, for example, from DE 39 06 040 as liquid crystals and from DE 102 04 236 as intermediates. E.g. U.S. Pat. Nos. 6,548,126, 6,395,353, WO 2008/009417 and US 2008/0063814 disclose compounds of the formula I in liquid-crystal mixtures.

Surprisingly, it has been found that it has been possible to achieve liquid-crystal displays which have a short response time in ECB displays and at the same time have a sufficiently broad nematic phase, favourable birefringence ($\Delta n$), a high clearing point, a low threshold voltage and a high voltage holding ratio.

Surprisingly, it has now been found that this object can be achieved if nematic liquid-crystal mixtures which comprise at least one compound of the formula I and at least one compound of formula II are used in these display elements.

The invention thus relates to a liquid-crystalline medium based on a mixture of polar compounds which comprises at least one compound of the formula I and at least one compound of formula II.

The invention relates to a liquid-crystalline medium based on a mixture of polar compounds which comprises
one or more compounds of the formula I

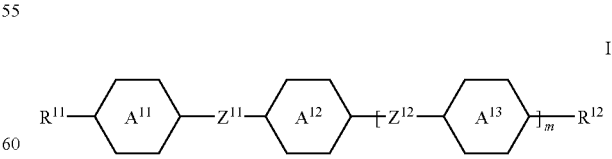

in which
$R^{11}$ and $R^{12}$ each independently of one another denote H, an unsubstituted alkyl or alkenyl radical having up to 15 C atoms, where, in addition, one or more $CH_2$ groups in these radicals may be replaced by —O—, —S—,

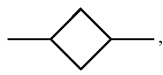

—C≡C—, —CF$_2$—O—, —CO—O— or —O—CO— in such a way that O atoms are not linked directly to one another, preferably an unsubstituted alkyl, alkenyl, alkoxy or alkenyloxy radical, particularly preferably one of $R^{11}$ and $R^{12}$ denotes an alkyl or alkenyl radical and the other denotes an alkyl, alkenyl, alkoxy or alkenyloxy radical, particularly preferably $R^{11}$ denotes straight-chain alkyl or alkenyl, in particular CH$_2$=CH—, E-CH$_3$—CH=CH—, CH$_2$=CH—CH$_2$—CH$_2$—, CH$_3$—CH=CHC$_2$H$_4$—, CH$_3$—, C$_2$H$_5$—, n-C$_3$H$_7$—, n-C$_4$H$_9$— or n-C$_5$H$_{11}$— and $R^{12}$ denotes straight-chain alkyl or alkoxy, in particular CH$_3$—, C$_2$H$_5$—, n-C$_3$H$_7$—, n-C$_4$H$_9$—, n-C$_5$H$_{11}$—, CH$_3$O—, C$_2$H$_5$O—, n-C$_3$H$_7$O— or n-C$_4$H$_9$O—, one of the rings

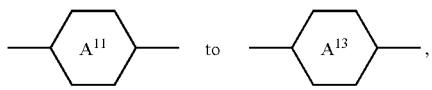

which is present, denotes

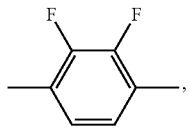

and another one of these rings, which is present, denotes

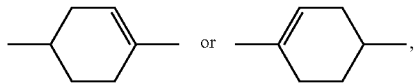

and the last one, if present, independently of the others, denotes

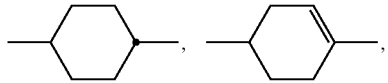
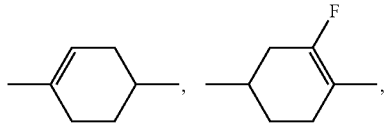

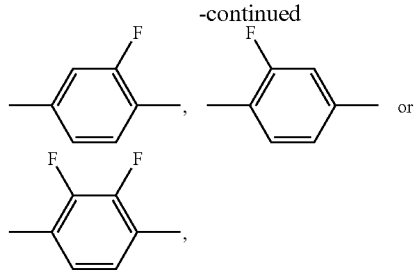

preferably

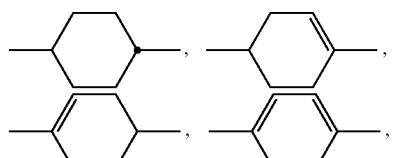

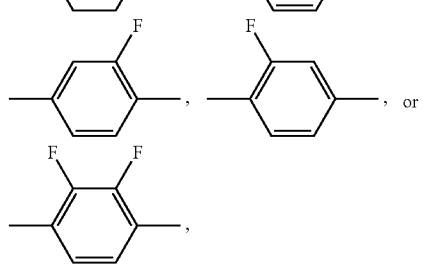

$Z^{11}$ and $Z^{12}$ each independently of one another denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, preferably —CH$_2$—CH$_2$—, —CH=CH—, —C≡C—, —CF$_2$—O—, —O—CF$_2$— or a single bond, particularly preferably one or, if present, more of $Z^{11}$ and $Z^{12}$ and very particularly preferably $Z^{11}$ and $Z^{12}$ both denote a single bond, m denotes 0 or 1, preferably 1 and
one or more compounds of the formula II

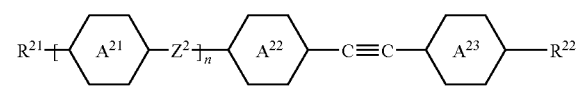

II in which
$R^{21}$ and $R^{22}$ each independently of one another denote H, an unsubstituted alkyl or alkenyl radical having up to 15 C atoms, where, in addition, one or more CH$_2$ groups in these radicals may be replaced by —O—, —S—,

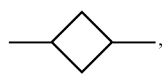

—C≡C—, —CF$_2$—O—, —O—CF$_2$—, —CO—O— or —O—CO— in such a way that O atoms are not linked directly to one another, preferably an unsubstituted alkyl, alkenyl, alkoxy or alkenyloxy radical, particularly preferably one of $R^{21}$ and $R^{22}$ denotes an alkyl or alkenyl radical and the other denotes an alkyl, alkenyl, alkoxy or alkenyloxy radical, preferably independently of one another alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 1 to 5 C atoms, or alkoxyalkyl, alkenyl or alkenyloxy having 2 to 7 C atoms, preferably having 2 to 4 C atoms, preferably alkenyl, where one or more H atoms in all groups may be replaced by halogen atoms, preferably F atoms, particularly preferably one of $R^{21}$ and $R^{22}$, preferably $R^{21}$, denotes an alkyl or alkenyl radical and the other denotes an alkyl, alkenyl, alkoxy or alkenyloxy radical, particularly preferably $R^{21}$ denotes straight-chain alkyl, in particular $CH_3-$, $C_2H_5-$, n-$C_3H_7$, n-$C_4H_9-$ or n-$C_5H_{11}-$, or alkenyl, in particular $CH_2=CH-$, E-$CH_3-CH=CH-$, $CH_2=CH-CH_2-CH_2-$, E-$CH_3-CH=CH-CH_2-CH_2-$ or E-n-$C_3H_7-CH=CH-$ and $R^{22}$ preferably denotes straight-chain alkyl or alkoxy, in particular $CH_3-$, $C_2H_5-$, n-$C_3H_7-$, n-$C_4H_9-$, n-$C_5H_{11}-$, $CH_3O-$, $C_2H_5O-$, n-$C_3H_7O-$ or n-$C_4H_9O-$,

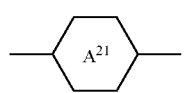

denotes

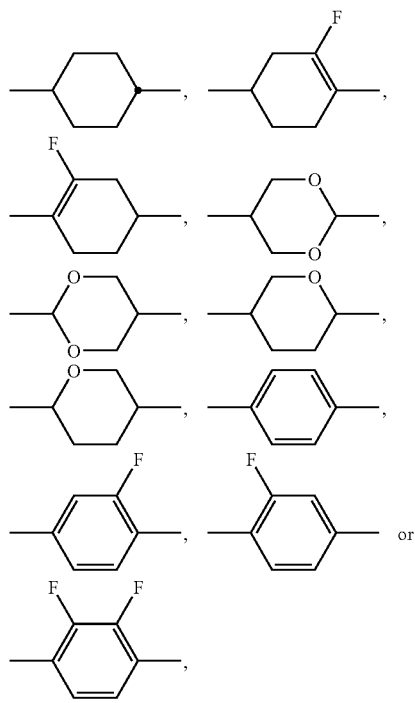

preferably

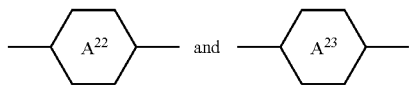

independently of one another denote

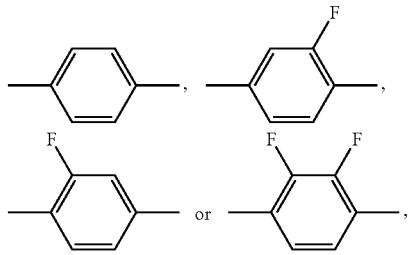

preferably one of them denotes

and the other one denotes

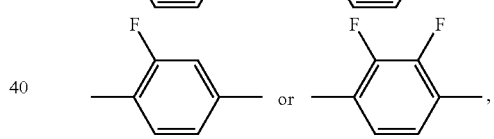

preferably

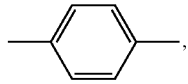

$Z^2$ denotes $-CH_2-CH_2-$, $-CH_2-CF_2-$, $-CF_2-CH_2-$, $-CF_2-CF_2-$, $-CH=CH-$, $-CF=CH-$, $-CH=CF-$, $-C\equiv C-$, $-CH_2-O-$, $-O-CH_2-$, $-O-$, $-CH_2-$, $-CO-O-$, $-O-CO-$, $-CF_2-O-$, $-O-CF_2-$ or a single bond, preferably $-CH_2-CH_2-$, $-CH=CH-$, $-C\equiv C-$, $-CF_2-O-$, $-O-CF_2-$, $-CO-O-$, $-O-CO-$ or a single bond, particularly preferably a single bond and n denotes 0 or 1.

Media of this type are beneficially to be used, in particular, for electro-optical displays with passive matrix addressing based on the ECB effect. The medium according to the invention preferably has negative dielectric anisotropy.

The mixtures according to the invention exhibit very broad nematic phase ranges with clearing points ≧80° C., very favourable values for the capacitive threshold, relatively high values for the holding ratio and at the same time very good low-temperature stabilities at −30° C. and −40° C. as well as very low rotational viscosities. The mixtures according to the invention are furthermore distinguished by a good ratio of clearing point and rotational viscosity and high negative dielectric anisotropy.

Particular preference is given to compounds of the formula I in which at least one of the groups

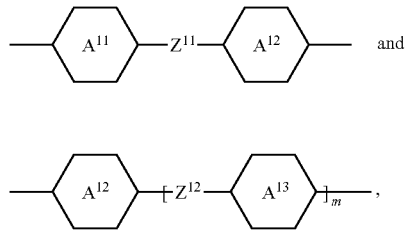

present in the compound of the formula I denotes

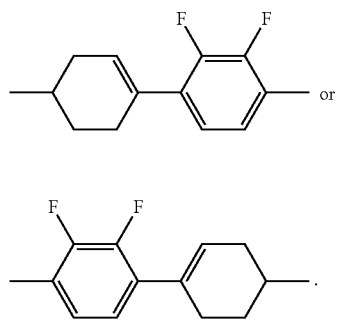

Particular preference is given to compounds of the formula I in which
a) $R^{11}$ and/or $R^{12}$ denote H, alkyl, alkenyl or alkoxy, preferably having up to 6 C atoms, $R^{12}$ very particularly preferably denotes alkoxy or alkenyloxy,
b) $R^{11}$ and $R^{12}$ both denote alkyl, where the alkyl radical may be identical or different,
c) $R^{11}$ denotes straight-chain alkyl, vinyl, 1E-alkenyl or 3-alkenyl, preferably n-alkyl.

If $R^{11}$ and/or $R^{12}$ denote alkenyl, this is preferably $CH_2=CH-$, $CH_3-CH=CH-$, $CH_2=CH-C_2H_4-$ or $CH_3-CH=CH-C_2H_4-$.

The medium according to the invention preferably comprises one, two, three, four or more, preferably one, two or three, compounds of the formula I.

The media according to the invention are preferably dielectrically negative.

The liquid-crystal media according to the invention preferably additionally comprise
one or more dielectrically negative compounds of the formula III

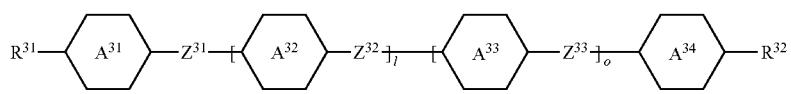

in which
$R^{31}$ and $R^{32}$ each independently of one another denote H, an unsubstituted alkyl or alkenyl radical having up to 15 C atoms, where, in addition, one or more $CH_2$ groups in these radicals may be replaced by —O—, —S—,

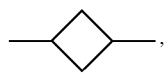

—C≡C—, —$CF_2$—O—, —O—$CF_2$—, —CO—O— or —O—CO— in such a way that O atoms are not linked directly to one another, preferably an unsubstituted alkyl, alkenyl, alkoxy or alkenyloxy radical, particularly preferably one of $R^{31}$ and $R^{32}$ denotes an alkyl or alkenyl radical and the other denotes an alkyl, alkenyl, alkoxy or alkenyloxy radical, preferably independently of one another alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 1 to 5 C atoms, or alkoxyalkyl, alkenyl or alkenyloxy having 2 to 7 C atoms, preferably having 2 to 4 C atoms, preferably alkenyl, where one or more H atoms in all groups may be replaced by halogen atoms, preferably F atoms, particularly preferably one of $R^{31}$ and $R^{32}$, preferably $R^{31}$, denotes an alkyl or alkenyl radical and the other denotes an alkyl, alkenyl, alkoxy or alkenyloxy radical, particularly preferably $R^{31}$ denotes straight-chain alkyl, in particular $CH_3-$, $C_2H_5-$, n-$C_3H_7$, n-$C_4H_9-$ or n-$C_5H_{11}-$, or alkenyl, in particular $CH_2=CH-$, E-$CH_3-CH=CH-$, $CH_2=CH-CH_2-CH_2-$, E-$CH_3-CH=CH-CH_2-CH_2-$ or E-n-$C_3H_7-CH=CH-$, one of the rings

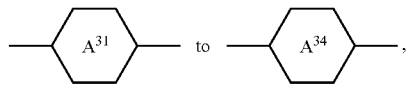

which is present, denotes

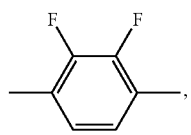

and the others, if present, each independently of one another denote denotes

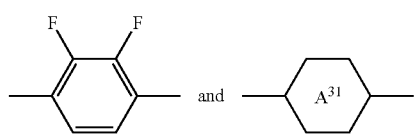

denotes

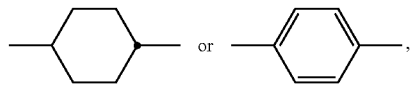

$Z^{31}$ to $Z^{33}$ each independently of one another denote —CH$_2$—CH$_2$—, —CH$_2$—CF$_2$—, —CF$_2$—CH$_2$—, —CF$_2$—CF$_2$—, —CH=CH—, —CF=CH—, —CH=CF—, —CH$_2$—O—, —O—CH$_2$—, —O—, —CH$_2$—, —CO—O—, —O—CO—, —CF$_2$—O—, —O—CF$_2$— or a single bond, preferably —CH$_2$—CH$_2$—, —CH=CH—, —CF$_2$—O—, —O—CF$_2$— or a single bond, particularly preferably one or, if present, more of $Z^{31}$ to $Z^{33}$ denote a single bond, and very particularly preferably all denote a single bond, l and o each independently of one another denote 0 or 1, and (l+o) preferably is 0 or 1, and/or one or more dielectrically neutral compounds of the formula IV

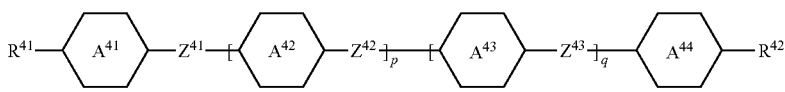

IV in which

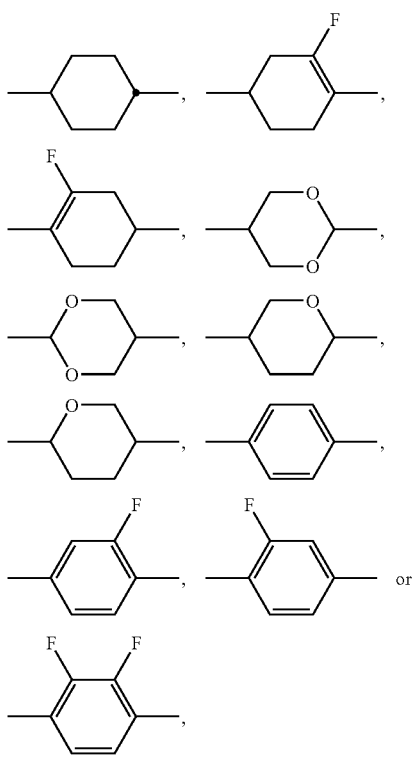

preferably

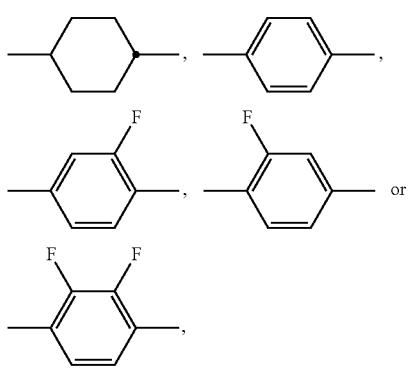

particularly preferably

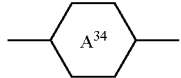

$R^{41}$ and $R^{42}$ each independently of one another have one of the meanings given for $R^{11}$ and $R^{12}$ and preferably denote alkyl having 1 to 7 C atoms, preferably n-alkyl and particularly preferably n-alkyl having 1 to 5 C atoms, alkoxy having 1 to 7 C atoms, preferably n-alkoxy and particularly preferably n-alkoxy having 2 to 5 C atoms, or alkoxyalkyl, alkenyl or alkenyloxy having 2 to 7 C atoms, preferably having 2 to 4 C atoms, preferably alkenyloxy,

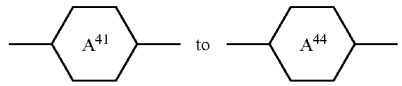

each independently of one another denote

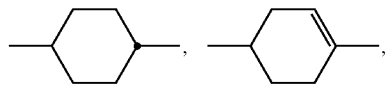

-continued

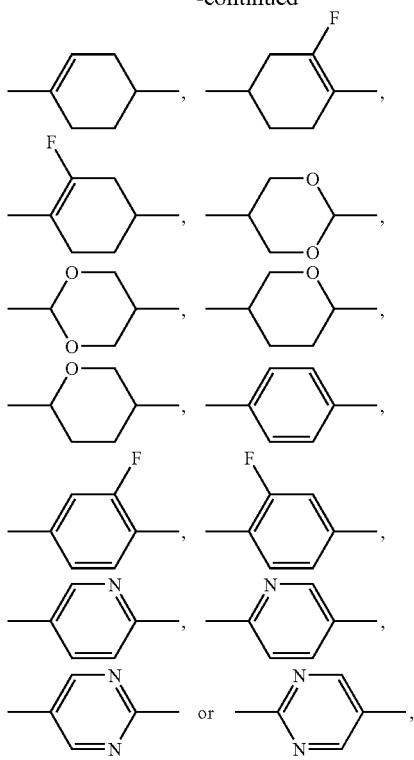

preferably

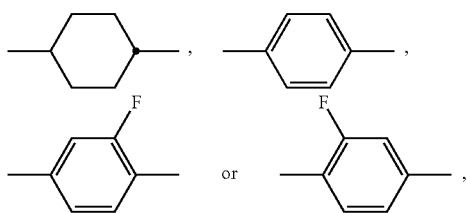

-continued

preferably denotes

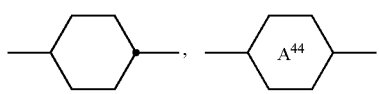

preferably denotes

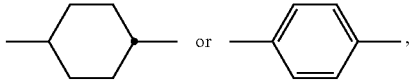

and, if present,

preferably denotes

$Z^{41}$ to $Z^{43}$ each independently of one another have one of the meanings given for $Z^{11}$ and $Z^{12}$ and preferably denote —CH$_2$—CH$_2$—, —CH═CH—, —C≡C—, —COO— or a single bond, preferably —CH$_2$—CH$_2$— or a single bond and particularly preferably a single bond, p and q each independently of one another denote 0 or 1, (p+q) preferably is 0 or 1, preferably 0, and/or one or more dielectrically negative compounds selected from the group of the compounds of the formulae V and VI

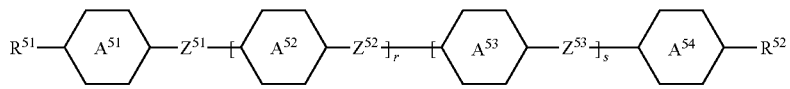 V

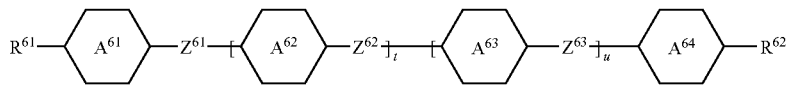 VI in which $R^{51}$, $R^{52}$, $R^{61}$ and $R^{62}$ each independently of one another have one of the meanings given for $R^{11}$ and $R^{12}$ and preferably denote alkyl having 1 to 7 C atoms, preferably n-alkyl and particularly preferably n-alkyl having 1 to 5 C atoms, alkoxy having 1 to 7 C atoms, preferably n-alkoxy and particularly preferably n-alkoxy having 2 to 5 C atoms, or alkoxyalkyl, alkenyl or alkenyloxy having 2 to 7 C atoms, preferably having 2 to 4 C atoms, preferably alkenyloxy, one of the rings
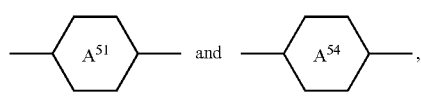
which is present, denotes
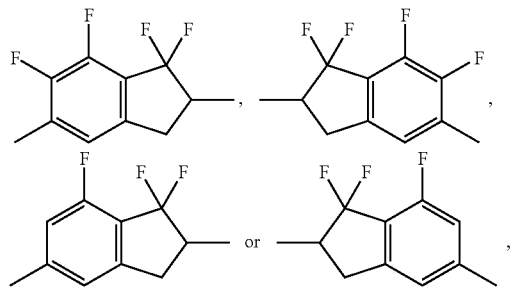
preferably
denotes
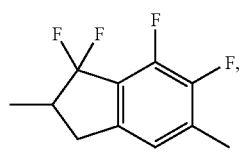
and the other rings
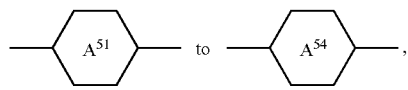
if present, each independently of one another denote
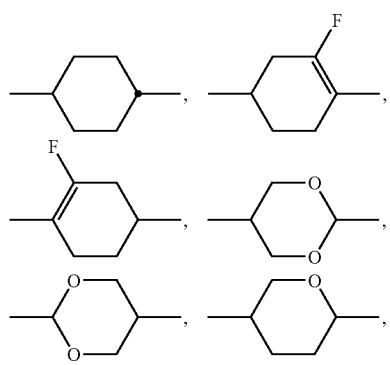
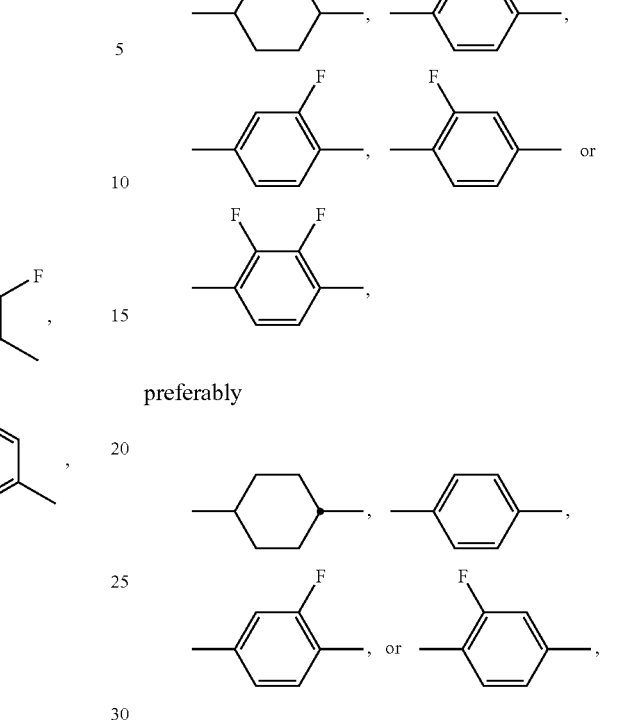
preferably
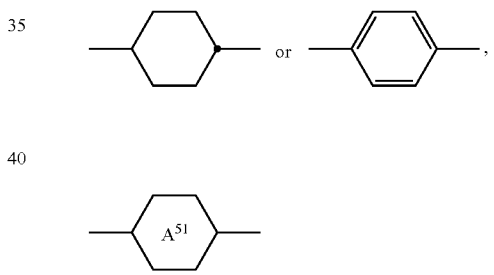
particularly preferably
alternatively also may denote a single bond, in the case where
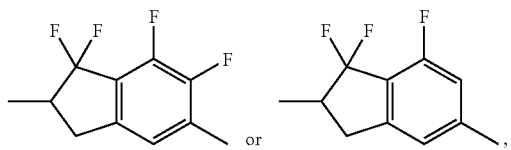
denotes $R^{52}$ preferably denotes H, one of the rings
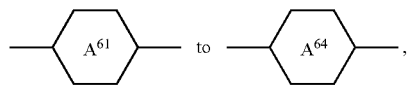
which is present, denotes
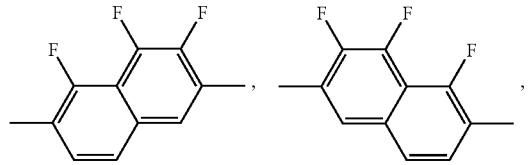
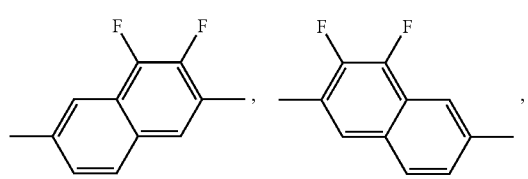
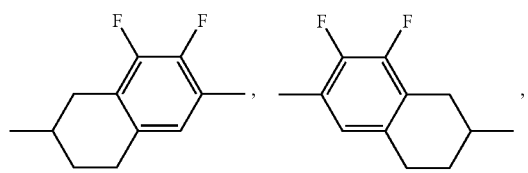
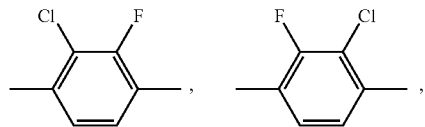
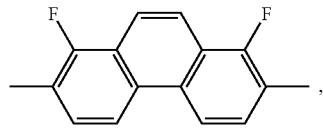
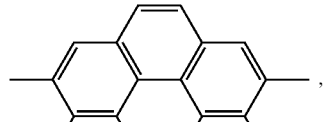
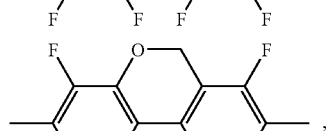
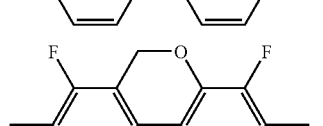
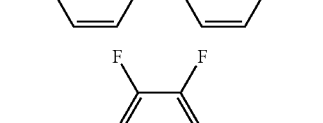
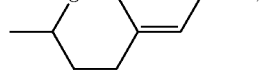
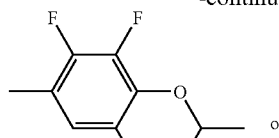
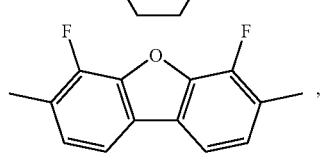
preferably
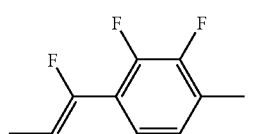
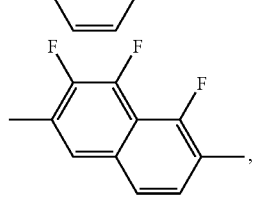
and the others, if present, each independently of one another denote
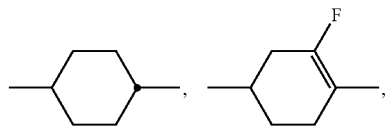
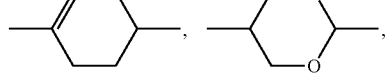
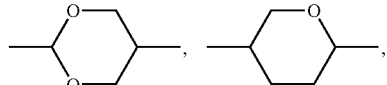
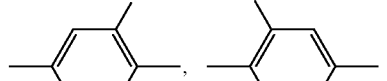
preferably
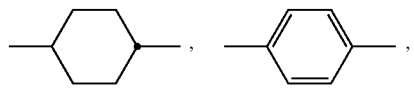

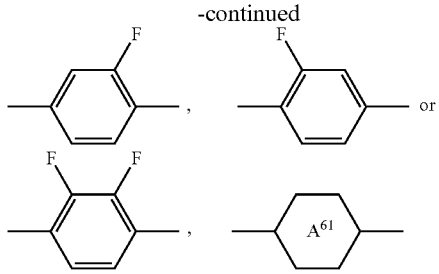

also denotes a single bond, $Z^{51}$ to $Z^{53}$ and $Z^{61}$ to $Z^{63}$ each independently of one another have one of the meanings given for $Z^{11}$ and $Z^{12}$ and preferably denote —CH$_2$—CH$_2$—, —CH=CH—, —C≡C—, —COO— or a single bond, preferably —CH$_2$—CH$_2$— or a single bond and particularly preferably a single bond, r and s each independently of one another denote 0 or 1, (r+s) preferably is 0 or 1, preferably 0, t and u each independently of one another denote 0 or 1, (t+u) preferably is 0 or 1, preferably 0, and optionally one or more chiral compounds.

The compounds of the formula I are preferably selected from its sub-formulae IA and IB

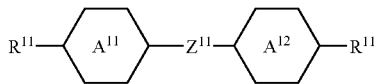

IA

IB in which the parameters have the meaning given above under formula I.

The compounds of the formula I are particularly preferably selected from its sub-formulae IA-1 and IB-1 to IB-3, preferably from sub-formulae IA-1 and/or IB-1

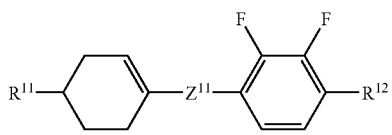

IA-1

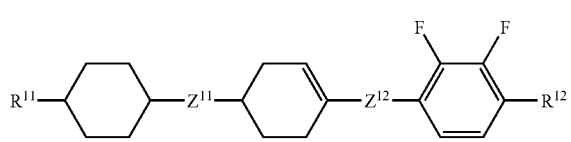

IB-1

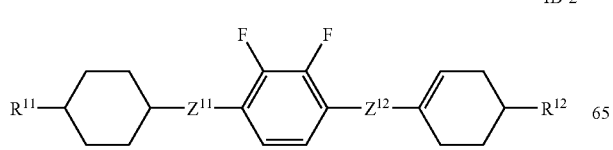

IB-2

IB-3 in which the parameters have the meaning given above, and preferably one or both of $Z^{11}$ and, if present, $Z^{12}$ denote a single bond.

The compounds of the formula I are very particularly preferably selected from its sub-formulae IA'-1 and/or IB'-1,

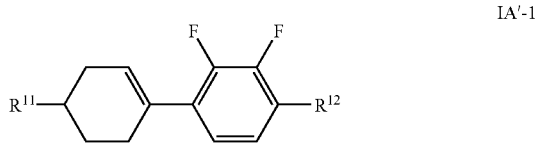

IA'-1

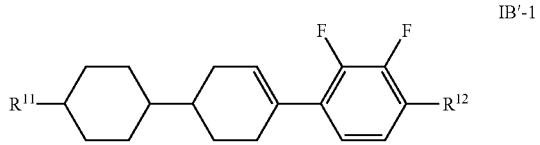

IB'-1 in which the parameters have the meaning given above, and $R^{11}$ and $R^{12}$ preferably independently of one another denote alkyl or alkoxy having 1 to 7, preferably having 1 to 5, C atoms, preferably n-alkyl or n-alkoxy, or alkenyl or alkenyloxy having 2 to 5 C atoms, preferably 1-alkenyl, and particularly preferably and in particular $R^{11}$ denotes $C_vH_{2v+1}$, where v denotes an integer from 1 to 6 and $R^{12}$ denotes $(O)C_wH_{2w+1}$, where w denotes an integer from 1 to 6.

In a further preferred embodiment, the medium comprises one or more compounds of the formula IB'-1 selected from the group of the compounds of the formulae IB'-1a to IB'-1d, preferably of the formulae IB'-1a and/or IB'-1b,

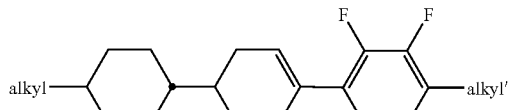

IB'-1a

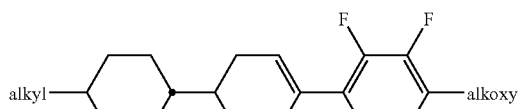

IB'-1b

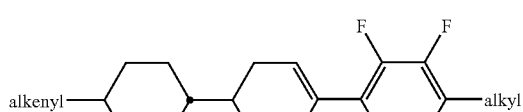

IB'-1c

-continued

IB'-1d

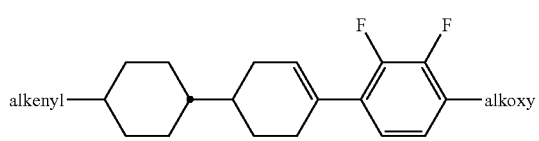

in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms.

In a preferred embodiment, the medium comprises one or more compounds of the formula II, selected from the group of the compounds of the formulae II-1 and II-2,

II-1

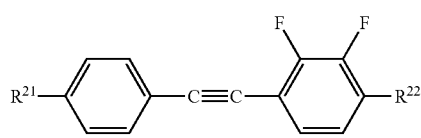

II-2

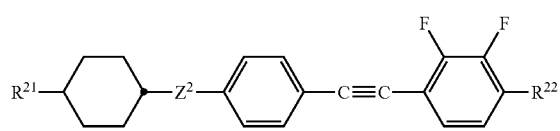

in which the parameters have the meanings indicated above and $R^{21}$ preferably denotes alkyl, $R^{22}$ preferably denotes alkoxy and $Z^2$ preferably denotes —CO—O—, —CH$_2$—CH$_2$— or a single bond and most preferably a single bond.

In a preferred embodiment, the medium comprises one or more compounds of the formula III selected from the group of the compounds of the formulae III-1 to III-7, preferably of formulae III-1 and/or III-4 and/or III-5

III-1

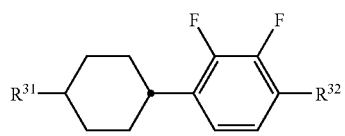

III-2

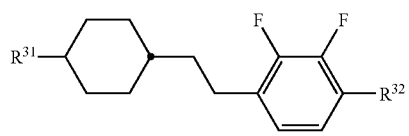

III-3
III-4

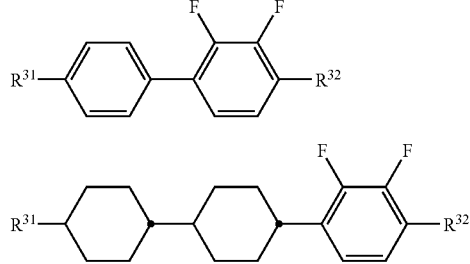

III-5

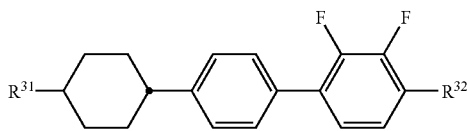

III-6

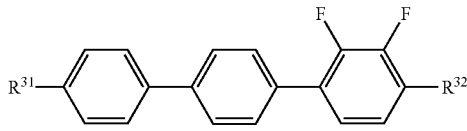

III-7

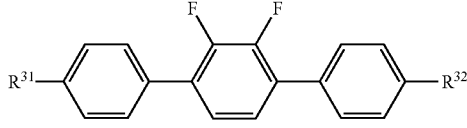

in which the parameters have the respective meaning indicated above for formula III, and preferably
$R^{31}$ denotes alkyl or alkenyl, and
$R^{32}$ denotes alkyl, alkenyl, alkoxy or alkenyloxy, preferably (O)C$_v$H$_{2v+1}$, and
v denotes an integer from 1 to 6.

In a further preferred embodiment, the medium may comprise one or more compounds of the formula IV from the group of the compounds of the formulae IV-1 to IV-11, preferably selected from the group of the compounds of the formulae IV-1 to IV-9, preferably from the group IV-1 to IV-6 and particularly preferably from the group IV-1 and IV-4,

IV-1

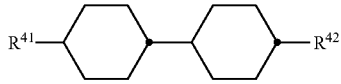

IV-2

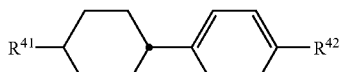

IV-3

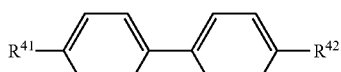

IV-4

IV-5

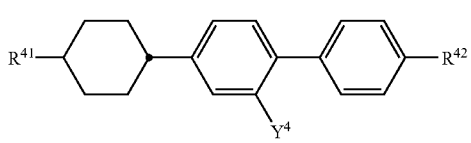

IV-6

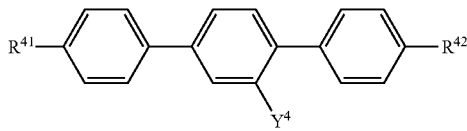

IV-7

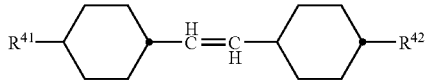

-continued

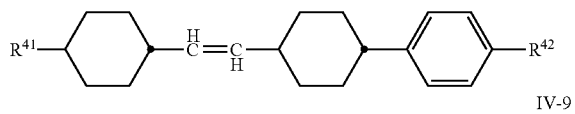
IV-8

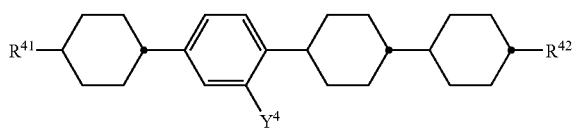
IV-9

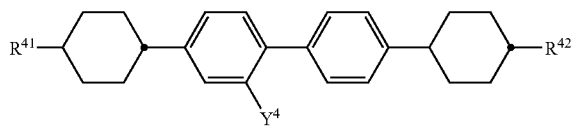
IV-10

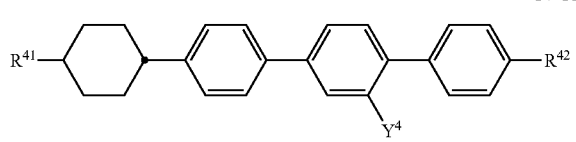
IV-11 in which the parameters have the respective meaning indicated above for formula IV, and
$Y^4$ denotes H or F, and preferably
$R^{41}$ denotes alkyl or alkenyl, and
$R^{42}$ denotes alkyl, alkenyl or alkoxy, preferably alkyl or alkenyl, particularly preferably alkenyl.

The medium particularly preferably comprises one or more compound(s) of the formula IV-1, selected from the group of the formula IV-1, particularly preferably
of the formula IV-1 in which $R^{41}$ denotes vinyl or 1-propenyl and $R^{42}$ denotes alkyl, preferably n-alkyl, particularly preferably $R^{41}$ denotes vinyl and $R^{42}$ denotes propyl, and
of the formula IV-1 in which $R^{41}$ and $R^{42}$ independently of one another denote vinyl or 1-propenyl, preferably $R^{41}$ denotes vinyl and particularly preferably $R^{41}$ and $R^{42}$ denote vinyl.

In a further preferred embodiment, the medium (additionally) comprises one or more compounds which contain an indane unit, preferably compounds of the formula V, preferably selected from the group of the compounds of the formulae V-1 and V-2,

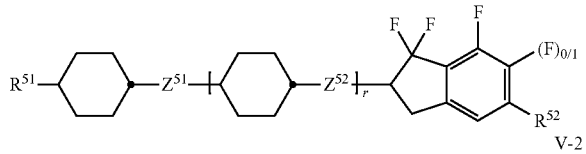
V-1

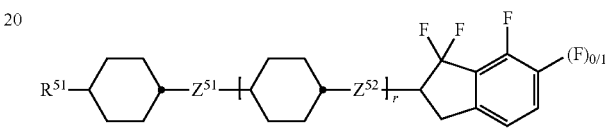
V-2 in which the parameters have the respective meaning indicated above for formula V, and preferably
$R^{51}$ denotes alkyl or alkenyl, and
$R^{52}$ denotes alkyl, alkenyl, alkoxy or alkenyloxy,
$Z^{51}$ denotes a single bond, and
r denotes 0.

The chiral compound or the chiral compounds which can be used in the liquid-crystal media in accordance with the present invention are selected from the known chiral dopants. Preferably they are selected from the compounds of the following formulae

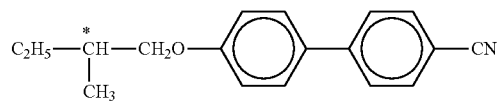 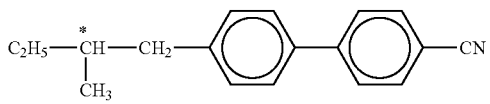

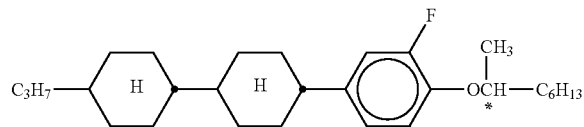

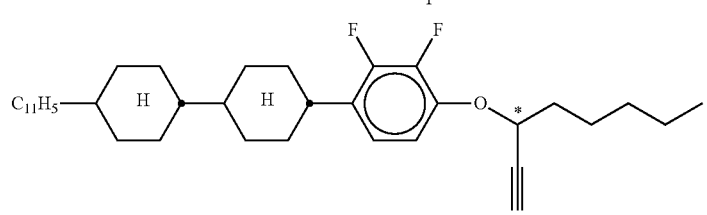

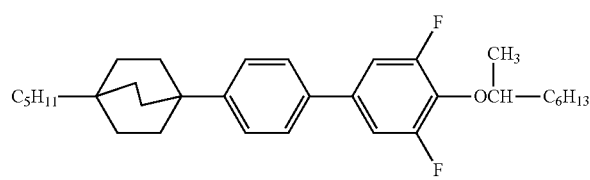

-continued

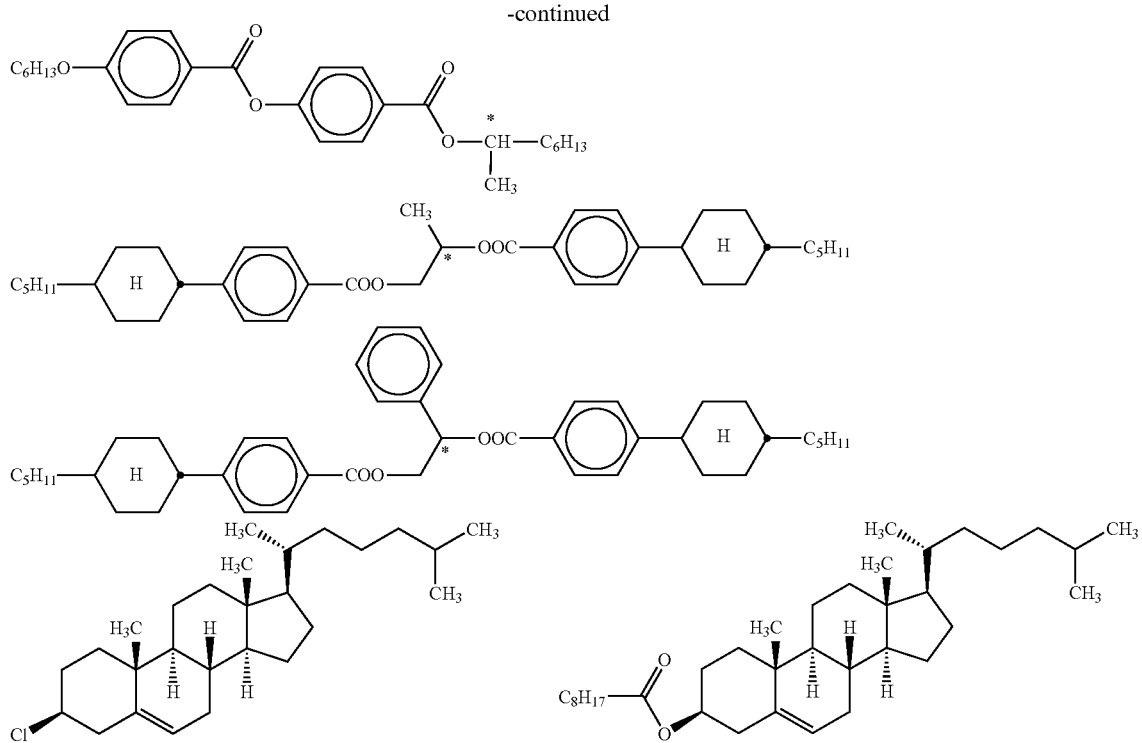

Particularly preferred embodiments of the present invention satisfy one or more of the following conditions.

The invention furthermore relates to an electro-optical display with active matrix addressing or positive matrix addressing based on the ECB effect, characterised in that it contains, as dielectric, a liquid-crystalline medium according to the present invention.

The liquid-crystal mixture preferably has a nematic phase range of at least 60 degrees and a flow viscosity $v_{20}$ of at most 30 mm$^2$·s$^{-1}$ at 20° C.

The liquid-crystal mixture according to the present invention has a value of $\Delta\epsilon$ of about −2.5 to −9.0, in particular of about −5.0 to −8.0, where $\Delta\epsilon$ denotes the dielectric anisotropy. The rotational viscosity $\gamma_1$ is preferably 200 mPa·s or less, in particular 170 mPa·s or less.

The birefringence $\Delta n$ of the liquid-crystal mixture according to the present invention is generally between 0.080 and 0.200, preferably between 0.100 and 0.180 more preferably between 0.110 and 0.160 and most preferably between 0.125 and 0.155.

The mixtures according to the invention are suitable for all VA-PM and VA-AM applications, such as, for example, VAN, MVA, (S)-PVA and ASV and especially for VA-PM applications. They are furthermore suitable for IPS (in-plane switching), FFS (fringe field switching) and PALC applications of negative $\Delta\epsilon$.

The liquid-crystal media according to the present application may also comprise 18 or more compounds, preferably 18 to 25 compounds.

The media preferably comprise 4 to 15, in particular 5 to 12, and particularly preferably 10 or less, compounds of the formulae I and/or II and 4 to 15, in particular 5 to 12, and particularly preferably 10 or less, compounds of formulae III and/or IV and/or V and/or VI.

Besides compounds of the formulae I to VI, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula VII $$R^{71}\text{-L-G-E-}R^{72} \qquad \text{VII}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| G denotes | —CH=CH— | —N(O)=N— |
|---|---|---|
| | —CH—CQ— | —CH=N(O)— |
| | —C≡C— | —CH$_2$—CH$_2$— |
| | —CO—O— | —CH$_2$—O— |
| | —CO—S— | —CH$_2$—S— |
| | —CH=N— | —COO-Phe-COO— |
| | —CF$_2$O— | —CF=CF— |
| | —OCF$_2$— | —OCH$_2$— |
| | —(CH$_2$)$_4$— | —(CH$_2$)$_3$O— | or a C—C single bond, Q denotes halogen, preferably chlorine, or —CN, and $R^{71}$ and $R^{72}$ each denote alkyl, alkenyl, alkoxy, alkanoyloxy or alkoxycarbonyloxy having up to 18, preferably up to 8, carbon atoms, or one of these radicals alternatively denotes CN, NC, NO$_2$, NCS, CF$_3$, OCF$_3$, F, Cl or Br.

In most of these compounds, R$^{71}$ and R$^{72}$ are different from one another, one of these radicals usually being an alkyl or alkoxy group. Other variants of the proposed substituents are also common. Many such substances or also mixtures thereof are commercially available. All these substances can be prepared by methods known from the literature.

The concentration of the compounds of the formula VII in the mixture as a whole is preferably 1% to 25%, particularly preferably 1% to 15% and very particularly preferably 2% to 9%.

The media according to the invention may optionally also comprise a dielectrically positive compounds, the total concentration of which, however, is preferably 10% or less, based on the entire medium.

In a preferred embodiment, the liquid-crystal media according to the invention comprise in total, based on the mixture as a whole, 3% or more to 40% or less, preferably 5% or more to 30% or less, preferably 7% or more to 25% or less and particularly preferably 9% or more to 20% or less and very particularly preferably 10% or more to 15% or less of compounds of formula I and 2% or more to 50% or less, preferably 4% or more to 40% or less, preferably 5% or more to 35% or less and particularly preferably either 6% or more to 25% or less or 26% or more to 33% or less of compounds of formula II and 30% or more to 95% or less, preferably 50% or more to 94% or less, preferably 55% or more to 92% or less and particularly preferably 60% or more to 90% or less 65% or more to 85% or less of compounds of formula III.

In a preferred embodiment, the liquid-crystal media according to the invention comprise compounds of formulae I and II and III, each and preferably one or more compounds selected from the group of compounds of formulae IV, V and VI, they preferably consist predominantly, particularly preferably essentially and very particularly preferably virtually completely of the said compounds.

The liquid-crystal media according to the invention preferably have a nematic phase from in each case at least –20° C. or less to 70° C. or more, particularly preferably from –30° C. or less to 80° C. or more, very particularly preferably from –40° C. or less to 85° C. or more and most preferably from –40° C. or less to 90° C. or more.

The term "have a nematic phase" here means on the one hand that no smectic phase and no crystallisation are observed at low temperatures at the corresponding temperature and on the other hand that no clearing occurs on heating out of the nematic phase. The investigation low temperatures is carried out in a flow viscometer at the corresponding temperature and checked by storage in test cells having a cell thickness corresponding to the electro-optical application for at least 100 hours. If the storage stability at a temperature of –20° C. in a corresponding test cell is 1000 h or more, the medium is regarded as stable at this temperature. At temperatures of –30° C. and –40° C., the corresponding times are 500 h and 250 h respectively. At high temperatures, the clearing point is measured in capillaries by conventional methods.

In a preferred embodiment, the liquid-crystal media according to the invention are characterised by optical anisotropy values in the moderate to low region. The birefringence values are preferably in the range from 0.100 or more to 0.230 or less, more preferably in the range from 0.120 or more to 0.180 or less and very particularly preferably in the range from 0.130 or more to 0.160 or less.

In this embodiment, the liquid-crystal media according to the invention have negative dielectric anisotropy and have relatively high absolute values of the dielectric anisotropy ($|\Delta\epsilon|$), which are preferably in the range from 6.0 or more to 10.0 or less, preferably up to 9.0 or less, preferably from 7.0 or more to 8.5 or less and particularly preferably from 7.5 or more to 8.0 or less.

The liquid-crystal media according to the invention have relatively low values for the threshold voltage ($V_0$) in the range from 1.0 V or more to 2.5 V or less, preferably from 1.2 V or more to 2.0 V or less, particularly preferably from 1.3 V or more to 1.8 V or less and very particularly preferably from 1.50 V or more to 1.65 V or less.

In addition, the liquid-crystal media according to the invention have high values for the voltage holding ratio in liquid-crystal cells.

In freshly filled cells at 20° C. in the cells, these are greater than or equal to 95%, preferably greater than or equal to 97%, particularly preferably greater than or equal to 98% and very particularly preferably greater than or equal to 99%, and after 5 minutes in the oven at 100° C. in the cells, these are greater than or equal to 90%, preferably greater than or equal to 93%, particularly preferably greater than or equal to 96% and very particularly preferably greater than or equal to 98%.

In general, liquid-crystal media having a low addressing voltage or threshold voltage here have a lower voltage holding ratio than those having a greater addressing voltage or threshold voltage, and vice versa.

These preferred values for the individual physical properties are preferably also in each case maintained by the media according to the invention in combination with one another.

In the present application, the term "compounds", also written as "compound(s)", means both one and also a plurality of compounds, unless explicitly indicated otherwise.

Unless indicated otherwise, the individual compounds are generally employed in the mixtures in concentrations from in each case 1% or more to 30% or less, preferably from 2% or more to 30% or less and particularly preferably from 4% or more to 16% or less.

For the present invention, the following definitions apply in connection with the specification of the constituents of the compositions, unless indicated otherwise in individual cases:

"comprise": the concentration of the constituents in question in the composition is preferably 5% or more, particularly preferably 10% or more, very particularly preferably 20% or more, "predominantly consist of": the concentration of the constituents in question in the composition is preferably 50% or more, particularly preferably 55% or more and very particularly preferably 60% or more, "essentially consist of": the concentration of the constituents in question in the composition is preferably 80% or more, particularly preferably 90% or more and very particularly preferably 95% or more, and "consist virtually completely of": the concentration of the constituents in question in the composition is preferably 98% or more, particularly preferably 99% or more and very particularly preferably 100.0%.

This applies both to the media as compositions with their constituents, which can be components and compounds, and also to the components with their constituents, the compounds. Only in relation to the concentration of an individual compound relative to the medium as a whole does the term comprise mean: the concentration of the compound in question is preferably 1% or more, particularly preferably 2% or more, very particularly preferably 4% or more.

For the present invention, "≦" means less than or equal to, preferably less than, and "≧" means greater than or equal to, preferably greater than.

For the present invention,

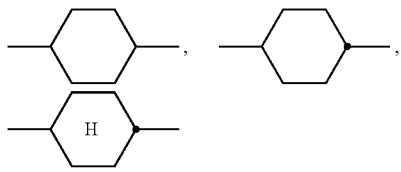

and "Cyc"
denote trans-1,4-cyclohexylene, and

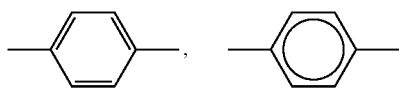

and "Phe"
denote 1,4-phenylene.

For the present invention, the term "dielectrically positive compounds" means compounds having a Δε>1.5, "dielectrically neutral compounds" means those having −1.5≦Δε≦1.5 and "dielectrically negative compounds" means those having Δε<−1.5. The dielectric anisotropy of the compounds is determined here by dissolving 10% of the compounds in a liquid-crystalline host and determining the capacitance of the resultant mixture in each case in at least one test cell having a cell thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

The host mixture used for dielectrically positive and dielectrically neutral compounds is ZLI-4792 and that used for dielectrically negative compounds is ZLI-2857, both from Merck KGaA, Germany. The values for the respective compounds to be investigated are obtained from the change in the dielectric constant of the host mixture after addition of the compound to be investigated and extrapolation to 100% of the compound employed. The compound to be investigated is dissolved in the host mixture in an amount of 10%. If the solubility of the substance is too low for this purpose, the concentration is halved in steps until the investigation can be carried out at the desired temperature.

The liquid-crystal media according to the invention may, if necessary, also comprise further additives, such as, for example, stabilisers and/or pleochroic dyes and/or chiral dopants in the usual amounts. The amount of these additives employed is preferably in total 0% or more to 10% or less, based on the amount of the entire mixture, particularly preferably 0.1% or more to 6% or less. The concentration of the individual compounds employed is preferably 0.1% or more to 3% or less. The concentration of these and similar additives is generally not taken into account when specifying the concentrations and concentration ranges of the liquid-crystal compounds in the liquid-crystal media.

In a preferred embodiment, the liquid-crystal media according to the invention comprise a polymer precursor which comprises one or more reactive compounds, preferably reactive mesogens, and, if necessary, also further additives, such as, for example, polymerisation initiators and/or polymerisation moderators, in the usual amounts. The amount of these additives employed is in total 0% or more to 10% or less, based on the amount of the entire mixture, preferably 0.1% or more to 2% or less. The concentration of these and similar additives is not taken into account when specifying the concentrations and concentration ranges of the liquid-crystal compounds in the liquid-crystal media.

The compositions consist of a plurality of compounds, preferably 3 or more to 30 or fewer, particularly preferably 6 or more to 20 or fewer and very particularly preferably 10 or more to 16 or fewer compounds, which are mixed in a conventional manner. In general, the desired amount of the components used in lesser amount is dissolved in the components making up the principal constituent of the mixture. This is advantageously carried out at elevated temperature. If the selected temperature is above the clearing point of the principal constituent, completion of the dissolution operation is particularly easy to see. However, it is also possible to prepare the liquid-crystal mixtures in other conventional ways, for example using premixes or from a so-called "multibottle system".

The mixtures according to the invention exhibit very broad nematic phase ranges with clearing points of 65° C. or more, very favourable values for the capacitive threshold, relatively high values for the holding ratio and at the same time very good low-temperature stabilities at −30° C. and −40° C. Furthermore, the mixtures according to the invention are distinguished by low rotational viscosities $\gamma_1$.

Some further preferred embodiments of the mixtures according to the invention are mentioned below.

a) The liquid-crystalline medium comprises one, two, three, four or more, preferably one, two or three, compounds of the formula I, preferably of formula IB'-1 and most preferably of formula IB'1b.

b) The proportion of compounds of the formula I in the liquid-crystalline medium in the mixture as a whole is 2% or more, preferably 4% or more, particularly preferably 10% or more to 25% or less, preferably 20% or less and most preferably 15% or less.

c) The proportion of compounds of the formulae II-1 and/or II-2 in the liquid-crystalline medium in the mixture as a whole is 2% or more, preferably 4% or more, particularly preferably 6% or more to 30% or less, preferably 25% or less and most preferably 20% or less.

d) The proportion of compounds of the formulae III-1 and/or III-4 and/or III-5 in the liquid-crystalline medium in the mixture as a whole is 60% or more, preferably 70% or more, particularly preferably 75% or more to 95% or less, preferably 90% or less and most preferably 85% or less.

e) Preferred liquid-crystal media according to the invention are those, which (additionally) comprise one or more compounds of the formula V selected from one or more formulae of the group of the formulae

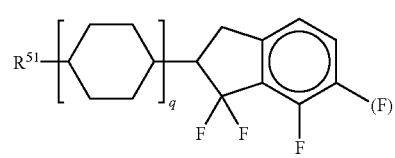

-continued

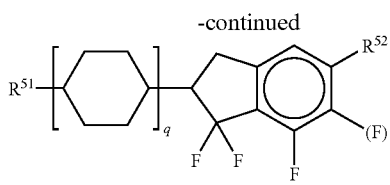

in which
R$^{51}$ and R$^{52}$ have the meanings indicated above, and q denotes 1 or 2, and R$^{52}$ preferably denotes CH$_3$, C$_2$H$_5$ or n-C$_3$H$_7$, preferably in amounts of 3% or more, in particular 5% or more and very particularly preferably in the range from 5 to 30%.

The invention furthermore in one preferred embodiment relates to an electro-optical display with active matrix addressing based on the ECB effect, characterised in that it contains, as dielectric, a liquid-crystalline medium according to the present application.

The liquid-crystal mixture according to the invention preferably has a nematic phase range of at least 60 degrees and a flow viscosity $v_{20}$ at 20° C. of 30 mm$^2$·s$^{-1}$ or less.

In a preferred embodiment, the liquid-crystal mixture according to the invention has a Δ∈ of about −5.0 to −9.0, in particular of about −7.0 to −8.0, where Δ∈ denotes the dielectric anisotropy. The rotational viscosity $\gamma_1$ is preferably 150 mPa·s or less, in particular 130 mPa·s or less.

The birefringence Δn in the liquid-crystal mixture is generally 0.23 or less, preferably between 0.100 and 0.200 and in particular between 0.110 and 0.160.

In a particularly preferred embodiment, the mixtures according to the invention comprise 1 to 35% of one or more compounds of the formula I, preferably of the formula IB'-1, particularly preferably of the formula IB'-1b and very particularly selected from the formula CLY-n-Om. The following individual compounds are preferably employed: CLY-2-O2, CLY-3-O2, CLY-3-O3 and/or CLY-2-O4. The concentrations of the individual compounds are preferably in the range from 2% or more to 15% or less.

The explanation of the constituents of these abbreviations is given in Tables A to C below, and the abbreviations used are summarised in Table D below.

These mixtures according to the present invention preferably comprise the following compounds:
  one or more compounds of the formula IB'-b, preferably in a total concentration of 5% or more preferably of 10% or more, preferably of 25% or less, more preferably of 20% or less, particularly preferably of 15% or less,
  one or more compounds of the formula II-1, preferably in a total concentration of 15% or less, particularly preferably 10% or less,
  one or more compounds of the formula II-2, preferably in a total concentration of 12% or less, particularly preferably 10% or less,
  optionally one or more compounds selected from the group of the formulae IV-1 and IV-4, particularly preferably of the formulae CC-n-Vm, CCP-nVm and CCP-Vn-m, and especially preferably the group of the formulae CC-3-V1, CC-4-V2 and CCP-nV-m, preferably in a total concentration of 15% or less, particularly preferably 5% or less, and the mixture very particularly preferably contains none of these compounds,
  optionally one or more compounds selected from the group of the formula IV-2, IV-3 and IV6, preferably the group of formulae CP-n-Om, PP-nVm-I, PGP-n-m and PGP-V-m, preferably in a total concentration of 5% or more to 20% or less.

Besides compounds of the formulae I, II-1 and/or II-2 and/or III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl- or cyclohexylbenzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ether, tolans and substituted cinnamic acid esters.

The liquid-crystalline mixtures according to the invention are prepared by mixing one or more compounds of the formula I with one or more further mesogenic compounds.

It goes without saying per se to the person skilled in the art that the media according to the invention for use in VA, IPS, FFS or PALC displays may also comprise compounds in which, for example, H, N, O, Cl, F have been replaced by the corresponding isotopes.

Polymerisable compounds, so-called "reactive mesogens" (RMs), for example as disclosed in U.S. Pat. No. 6,861,107, may furthermore be added to the mixtures according to the invention in concentrations of preferably 0.1 to 5%, particularly preferably 0.2 to 2%, based on the mixture. Mixtures of this type can be used for so-called polymer-stabilised VA modes, in which polymerisation of the reactive mesogens in the liquid-crystalline mixture is intended to occur. A prerequisite for this is that the liquid-crystal mixture does not itself comprise any polymerisable compounds, such as, for example, compounds containing activated alkenyl side chains.

The structure of the liquid-crystal displays according to the invention corresponds to the conventional geometry, as described, for example, in EP-A 0 240 379.

The liquid-crystal mixtures which can be used in accordance with the invention are prepared in a manner conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The liquid-crystal phases according to the invention can be modified by means of suitable additives in such a way that they can be employed in any type of, for example, ECB, VAN, IPS, GH or ASM-VA-LCD display that has been disclosed to date.

The dielectrics may advantageously also comprise one or more further additives known to the person skilled in the art and described in the literature, preferably selected from the group of the UV absorbers, antioxidants, nanoparticles and free-radical scavengers. For example, 0% to 15% of pleochroic dyes, stabilisers and/or chiral dopants may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)) in order to improve the conductivity, or substances may be added in order to modify the dielectric anisotropy, the viscosity and/or the alignment of the nematic phases, as can nanoparticles. Substances of this type are described, for example, in DE-A 22 09 127, 22 40 864, 23 21 632, 23 38 281, 24 50 088, 26 37 430 and 28 53 728.

Table E below indicates possible dopants which can be added to the mixtures according to the invention. If the mixtures comprise one or more dopants, it is (they are) employed in amounts of 0.01% to 4%, preferably 0.1% to 1.0%.

Stabilisers which can be added, for example, to the mixtures according to the invention, preferably in amounts of 0.01% to 6%, in particular 0.1% to 3%, are mentioned below in Table F.

For the purposes of the present invention, all concentrations are, unless explicitly noted otherwise, indicated in percent (%) by weight and relate to the corresponding mixture or mixture component, unless explicitly indicated otherwise.

All temperature values indicated in the present application, such as, for example, the melting point T(C,N), the smectic (S) to nematic (N) phase transition T(S,N) and the clearing point T(N,I), are indicated in degrees Celsius (° C.) and all temperature differences are correspondingly differential degrees (° or degree), unless explicitly indicated otherwise.

For the present invention, the term "threshold voltage" relates to the capacitive threshold ($V_0$), also known as the Freedericks threshold, unless explicitly indicated otherwise.

All physical properties are and have been determined in accordance with "Merck Liquid Crystals, Physical Properties of Liquid Crystals", status November 1997, Merck KGaA, Germany, and apply to a temperature of 20° C., and Δn is determined at 589 nm and Δ∈ at 1 kHz, unless explicitly indicated otherwise in each case.

The electro-optical properties, for example the threshold voltage ($V_0$) (capacitive measurement), are, as is the switching behaviour, determined in test cells produced at Merck KGaA. The measurement cells have soda-lime glass substrates and are constructed in an ECB or VA configuration with polyimide alignment layers (SE-1211 with diluent **26 (mixing ratio 1:1), both from Nissan Chemicals, Japan), which have been rubbed perpendicular to one another and effect a homeotropic alignment of the liquid crystals. The surface area of the transparent, virtually square electrodes of ITO is 1 cm$^2$.

Unless indicated otherwise, a chiral dopant is not added to the liquid-crystal mixtures used, but the latter are also particularly suitable for applications in which doping of this type is necessary.

The voltage holding ratio is determined in test cells produced at Merck KGaA. The measurement cells have substrates made from soda-lime glass and are constructed with polyimide alignment layers (AL-3046 from Japan Synthetic Rubber, Japan) with a layer thickness of 50 nm, which have been rubbed perpendicular to one another. The layer thickness is uniformly 6.0 μm. The surface area of the transparent electrodes of ITO is 1 cm$^2$.

The voltage holding ratio is determined at 20° C. ($HR_{20}$) and after 5 minutes in the oven at 100° C. ($H_{100}$)). The voltage used has a frequency of 60 Hz.

The rotational viscosity is determined using the rotating permanent magnet method and the flow viscosity in a modified Ubbelohde viscometer. For liquid-crystal mixtures ZLI-2293, ZLI-4792 and MLC-6608, all products from Merck KGaA, Darmstadt, Germany, the rotational viscosity values determined at 20° C. are 161 mPa·s, 133 mPa·s and 186 mPa·s respectively, and the flow viscosity values (v) are 21 mm$^2$·s$^{-1}$, 14 mm$^2$·s$^{-1}$ and 27 mm$^2$·s$^{-1}$ respectively.

The following symbols are used:

| | |
|---|---|
| $V_0$ | threshold voltage, capacitive [V] at 20° C., |
| $n_e$ | extraordinary refractive index measured at 20° C. and 589 nm, |
| $n_o$ | ordinary refractive index measured at 20° C. and 589 nm, |
| Δn | optical anisotropy measured at 20° C. and 589 nm, |
| $\epsilon_\perp$ | dielectric susceptibility perpendicular to the director at 20° C. and 1 kHz, |
| $\epsilon_\parallel$ | dielectric susceptibility parallel to the director at 20° C. and 1 kHz, |
| Δε | dielectric anisotropy at 20° C. and 1 kHz, |
| cl.p. or T(N,I) | clearing point [° C.], |
| $\gamma_1$ | rotational viscosity measured at 20° C. [mPa·s], |
| $K_1$ | elastic constant, "splay" deformation at 20° C. [pN], |
| $K_2$ | elastic constant, "twist" deformation at 20° C. [pN], |
| $K_3$ | elastic constant, "bend" deformation at 20° C. [pN], and |
| LTS | low temperature stability (phase), determined in test cells. |

The following examples explain the present invention without limiting it. However, they show the person skilled in the art preferred mixture concepts with compounds preferably to be employed and the respective concentrations thereof and combinations thereof with one another. In addition, the examples illustrate the properties and property combinations that are accessible.

For the present invention and in the following examples, the structures of the liquid-crystal compounds are indicated by means of acronyms, with the transformation into chemical formulae taking place in accordance with Tables A to C below. All radicals $C_nH_{2n+1}$, $C_mH_{2m+1}$ and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Table A shows the codes for the ring elements of the nuclei of the compound, Table B lists the bridging members, and Table C lists the meanings of the symbols for the left- and right-hand end groups of the molecules. Table D lists illustrative molecular structures and the abbreviations thereof.

TABLE A

Ring elements

C

D

DI

A

AI

TABLE A-continued

| Ring elements | |
|---|---|
| P | 1,4-phenylene |
| G | 3-fluoro-1,4-phenylene |
| GI | 2-fluoro-1,4-phenylene |
| U | 3,5-difluoro-1,4-phenylene |
| UI | 2,6-difluoro-1,4-phenylene |
| Y | 2,3-difluoro-1,4-phenylene |
| Np | naphthalene-2,6-diyl |
| N3f | trifluoronaphthalene-2,6-diyl |
| N3fI | trifluoronaphthalene-2,6-diyl (isomer) |
| tH | 1,2,3,4-tetrahydronaphthalene-2,6-diyl |
| tHI | 1,2,3,4-tetrahydronaphthalene-2,6-diyl (isomer) |
| tH2f | difluoro-tetrahydronaphthalene-2,6-diyl |
| tH2fI | difluoro-tetrahydronaphthalene-2,6-diyl (isomer) |
| dH | decahydronaphthalene-2,6-diyl |
| K | difluoro-indane-2,5-diyl |
| KI | difluoro-indane-2,5-diyl (isomer) |
| L | cyclohex-1-ene-1,4-diyl |
| LI | cyclohex-1-ene-1,4-diyl (isomer) |
| N | 1-cyano-cyclohexane-1,4-diyl |
| NI | 1-cyano-cyclohexane-1,4-diyl (isomer) |
| F | fluoro-cyclohexene-1,4-diyl |

TABLE A-continued

Ring elements

Fl

F

TABLE B

Bridging members

| | | | |
|---|---|---|---|
| E | —CH$_2$—CH$_2$— | | |
| V | —CH=CH— | | |
| T | —C≡C— | | |
| W | —CF$_2$—CF$_2$— | | |
| B | —CF=CF— | | |
| Z | —CO—O— | ZI | —O—CO— |
| X | —CF=CH— | XI | —CH=CF— |
| O | —CH$_2$—O— | OI | —O—CH$_2$— |
| Q | —CF$_2$—O— | QI | —O—CF$_2$— |

TABLE C

End groups

| On the left individually or in combination | | On the right individually or in combination | |
|---|---|---|---|
| -n- | C$_n$H$_{2n+1}$— | -n | —C$_n$H$_{2n+1}$ |
| -nO- | C$_n$H$_{2n+1}$—O— | -nO- | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |

| On the left only in combination | | On the right only in combination | |
|---|---|---|---|
| -...n...- | —C$_n$H$_{2n}$— | -...n... | —C$_n$H$_{2n}$— |
| -...M...- | —CFH— | -...M... | —CFH— |
| -...D...- | —CF$_2$— | -...D... | —CF$_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m are each integers, and the three dots "..." are place markers for other abbreviations from this table.

Besides the compounds of the formula I, the mixtures according to the invention preferably comprise one or more compounds of the compounds mentioned below.

The following abbreviations are used:

(n, m and l here are independently of each other integers from 1 to 7, preferably from 1 to 5)

TABLE D
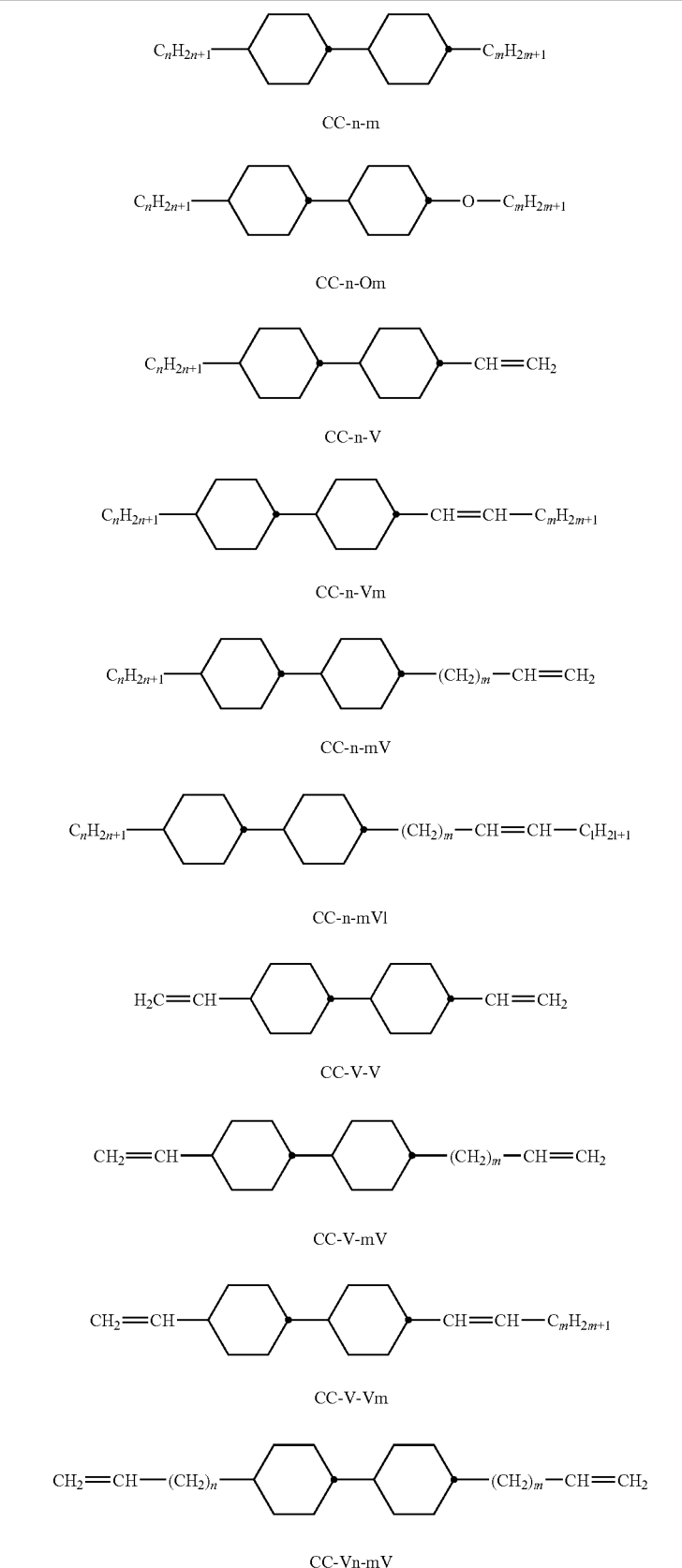

TABLE D-continued
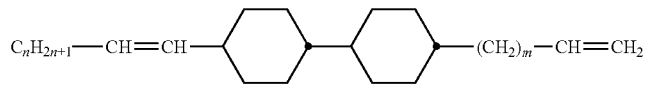
CC-nV-mV
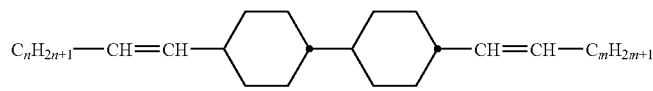
CC-nV-Vm
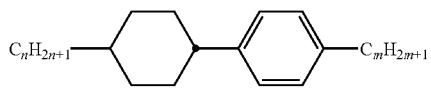
CP-n-m
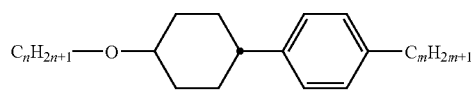
CP-nO-m
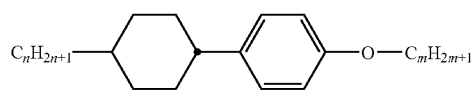
CP-n-Om
CCC-n-m
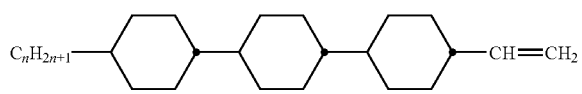
CCC-n-V
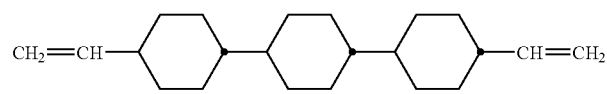
CCC-V-V
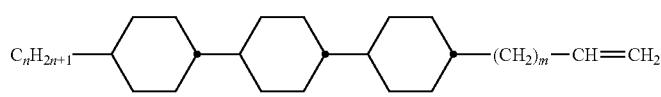
CCC-n-mV
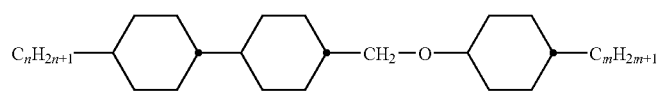
CCOC-n-m TABLE D-continued
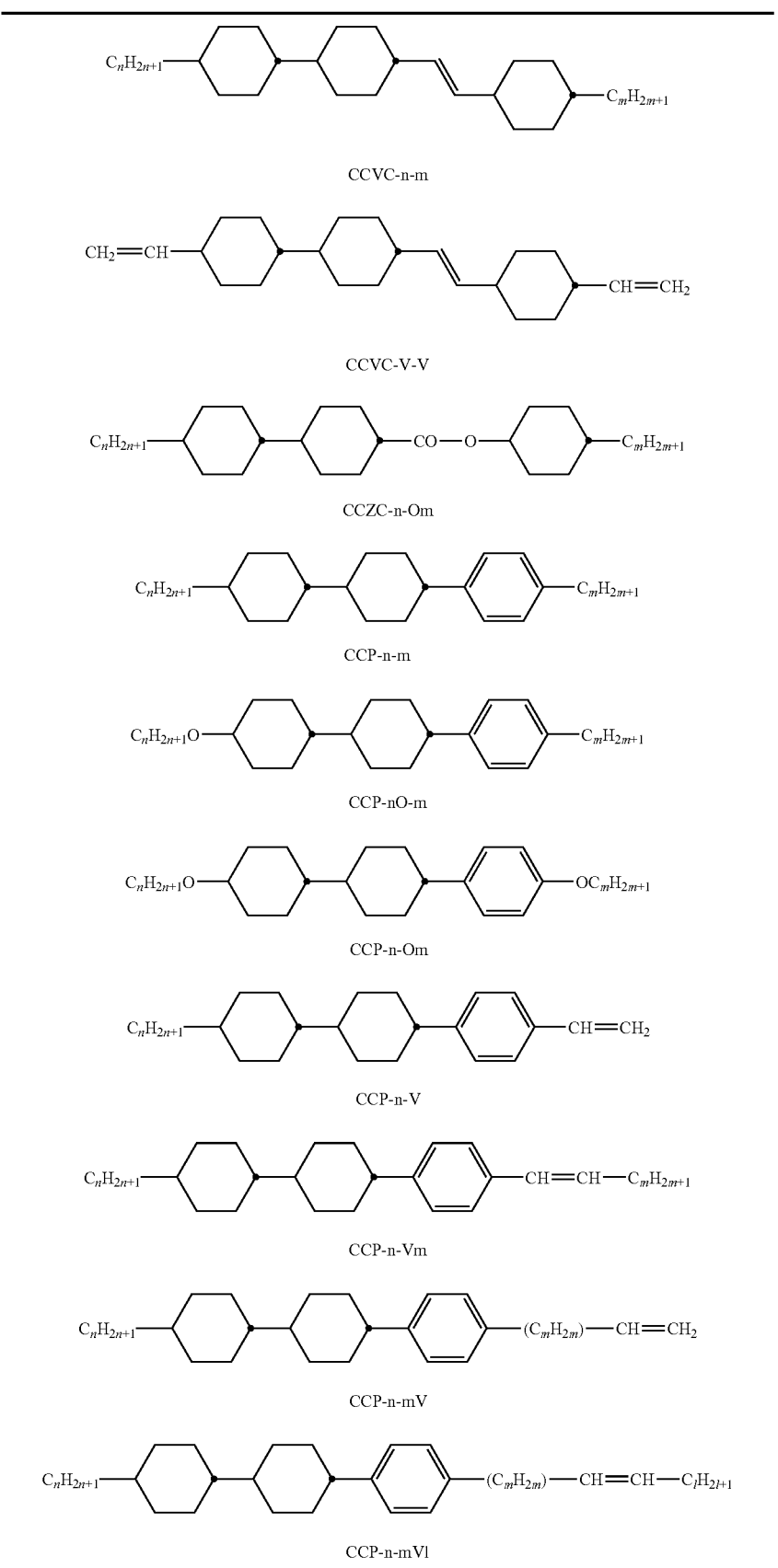

TABLE D-continued
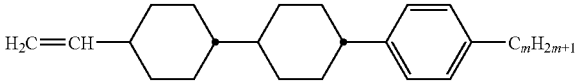
CCP-V-m
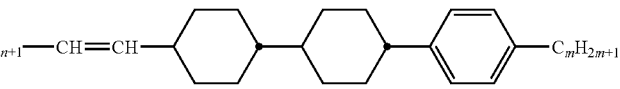
CCP-nV-m
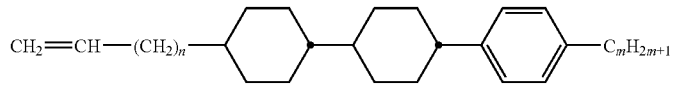
CCP-Vn-m
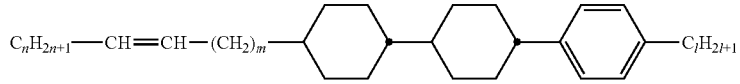
CCP-nVm-l
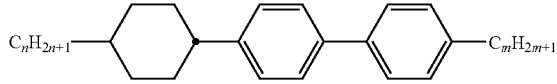
CPP-n-m
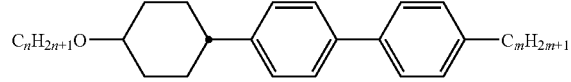
CPP-nO-m
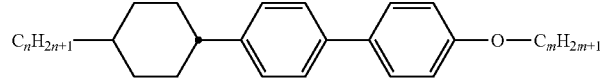
CPP-n-Om
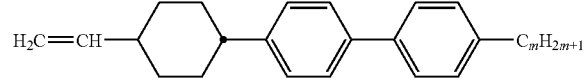
CPP-V-m
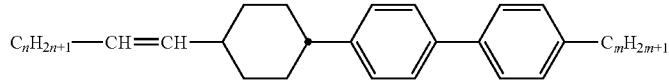
CPP-nV-m
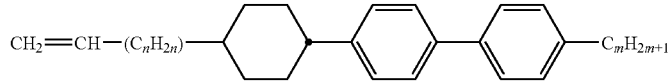
CPP-Vn-m
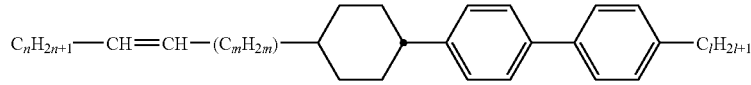
CPP-nVm-l TABLE D-continued
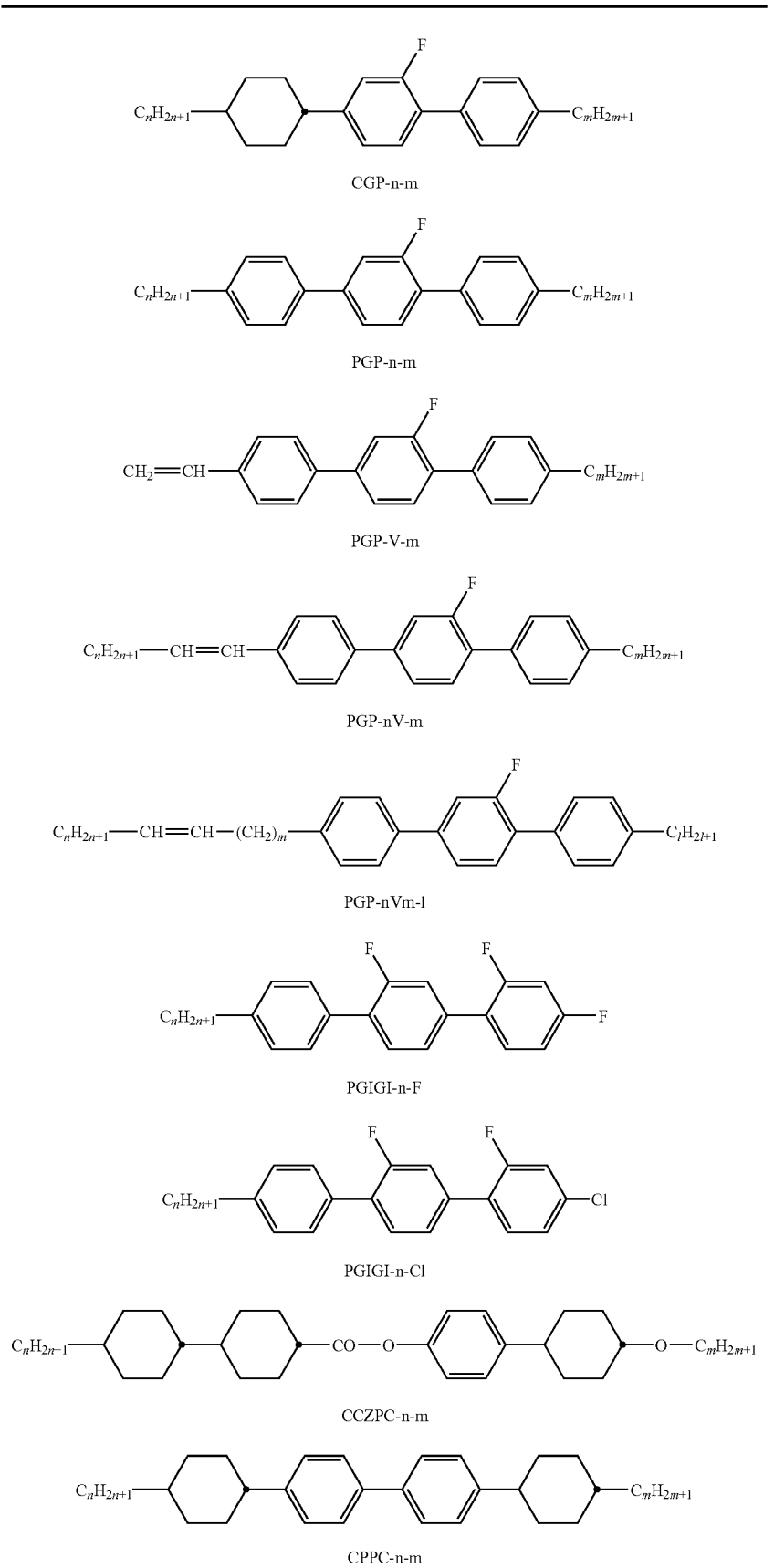

TABLE D-continued
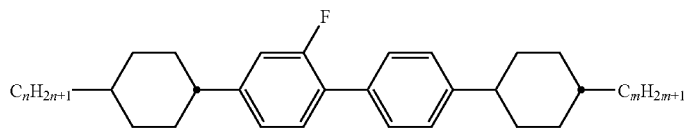
CGPC-n-m
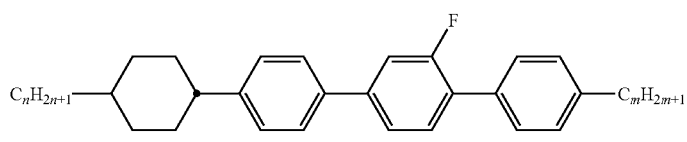
CPGP-n-m
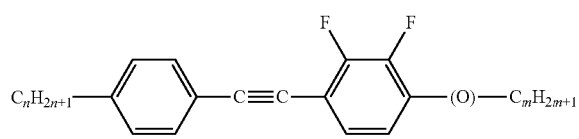
PTY-n-(O)m
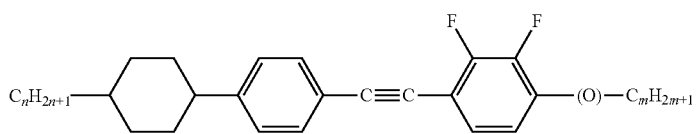
CPTY-n-(O)m
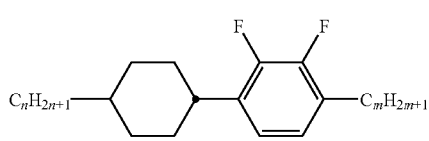
CY-n-m
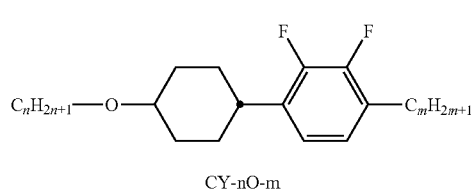
CY-nO-m
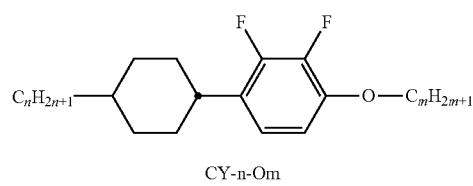
CY-n-Om
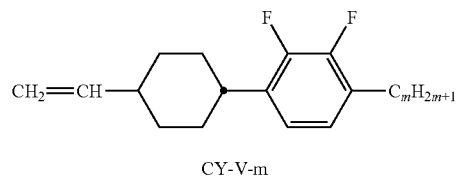
CY-V-m TABLE D-continued
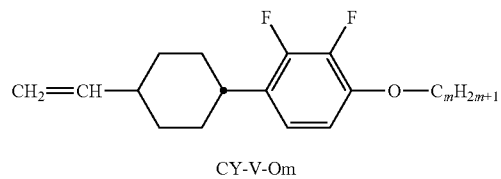
CY-V-Om
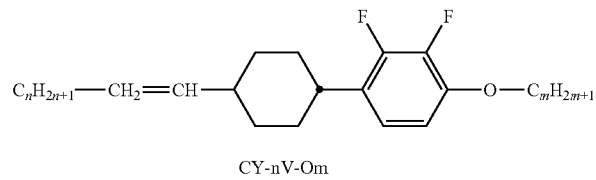
CY-nV-Om
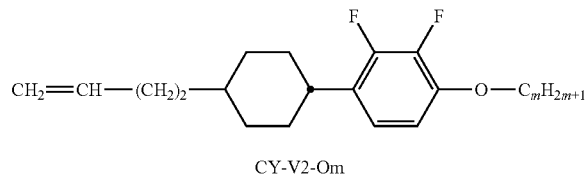
CY-V2-Om
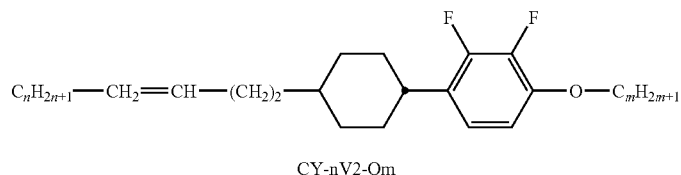
CY-nV2-Om
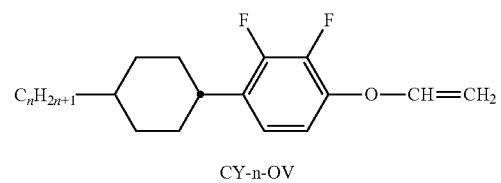
CY-n-OV
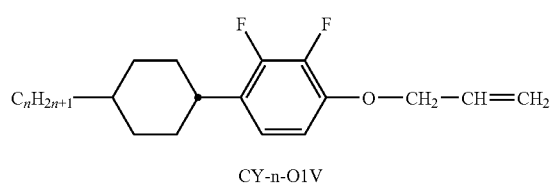
CY-n-O1V
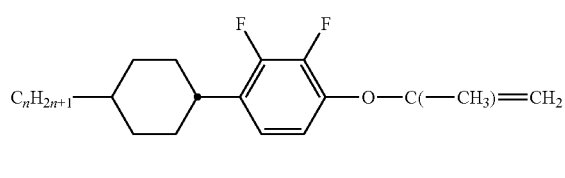
CY-n-OC(CH3)=CH2
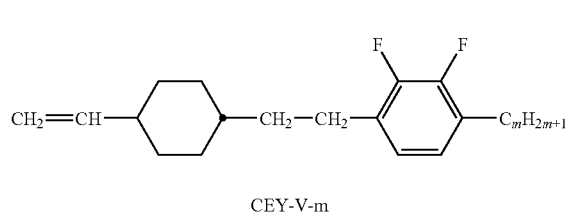
CEY-V-m TABLE D-continued
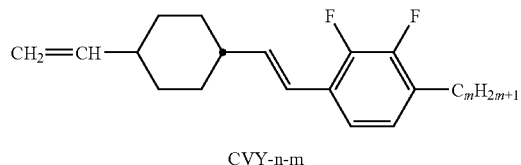
CVY-n-m
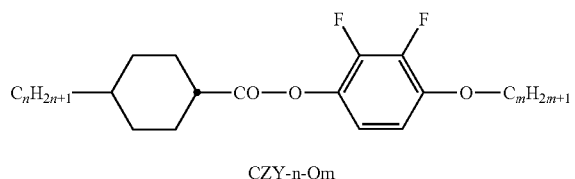
CZY-n-Om
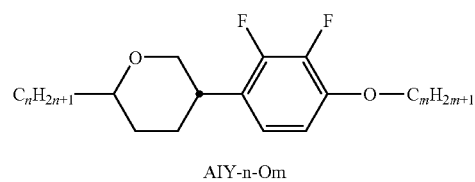
AIY-n-Om
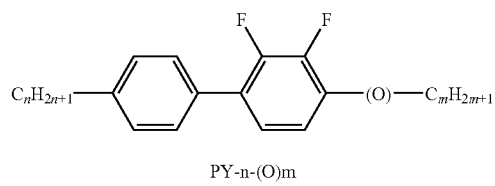
PY-n-(O)m
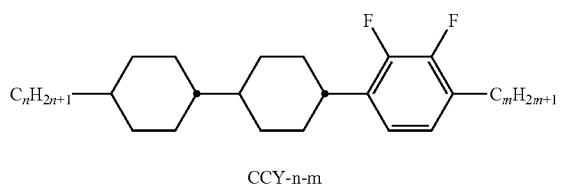
CCY-n-m
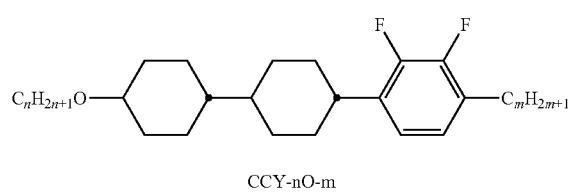
CCY-nO-m
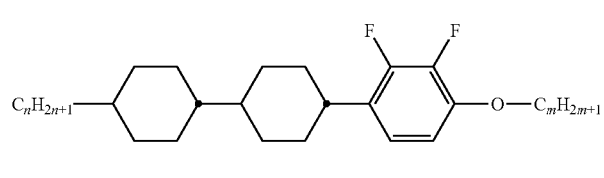
CCY-n-Om
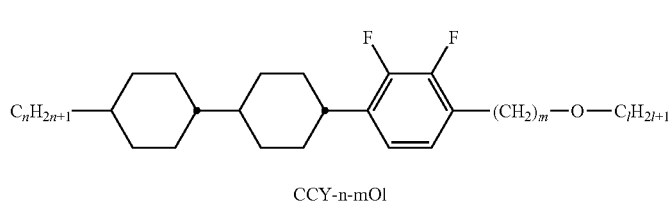
CCY-n-mOl TABLE D-continued
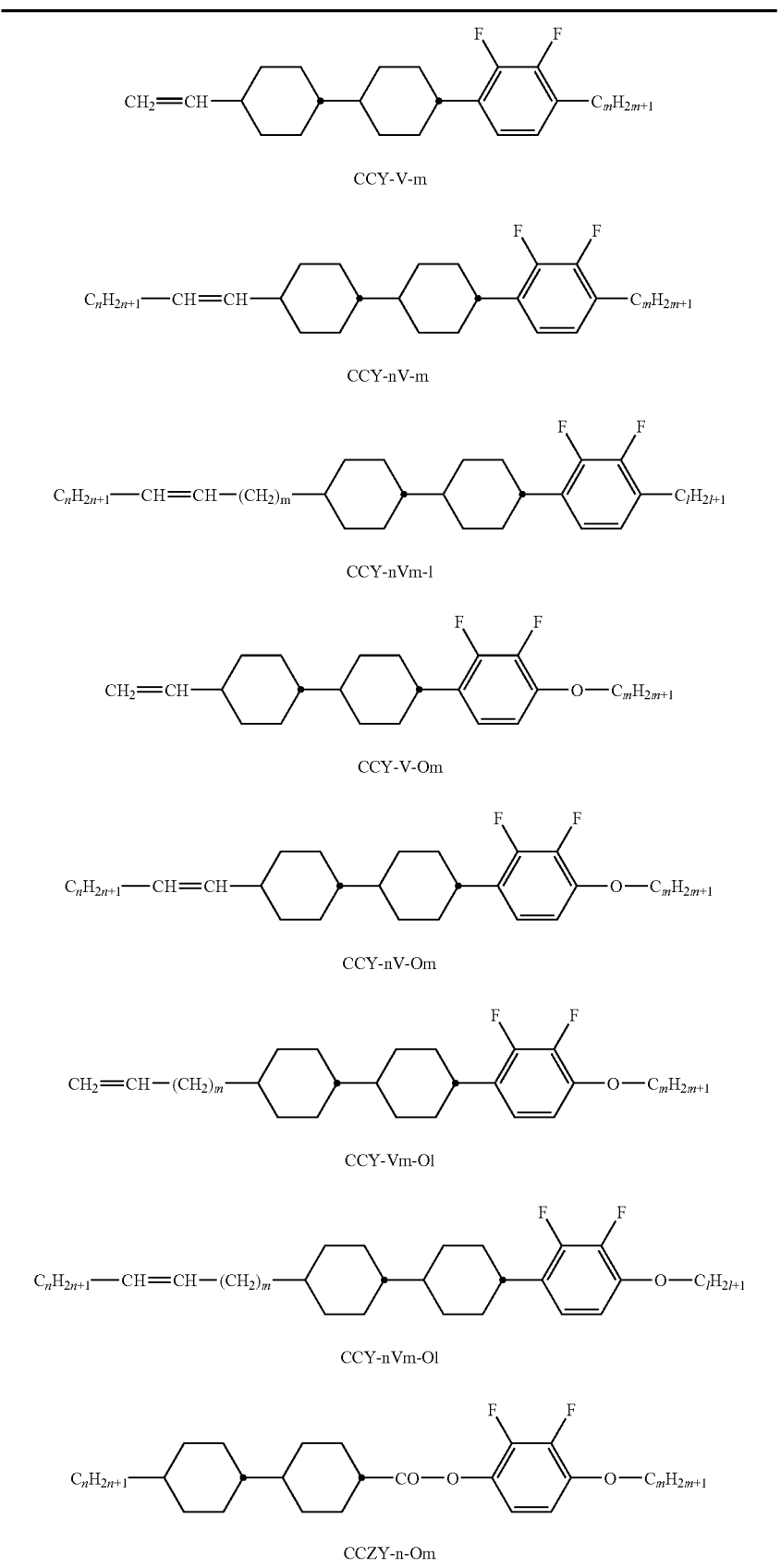

TABLE D-continued
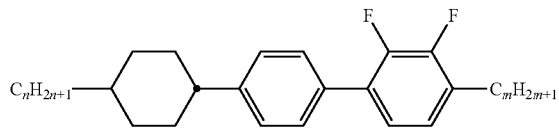
CPY-n-m
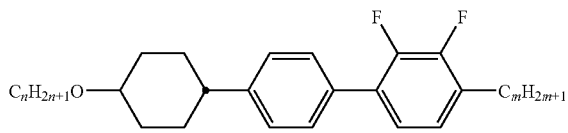
CPY-nO-m
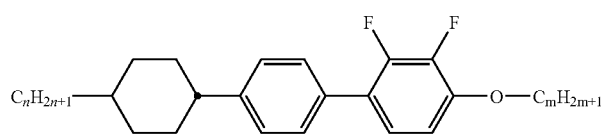
CPY-n-Om
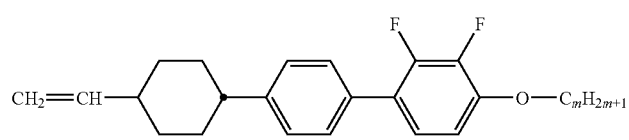
CPY-V-Om
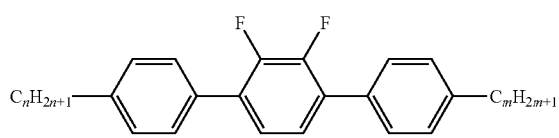
PYP-n-m
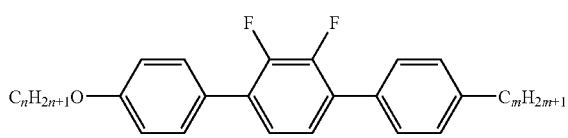
PYP-nO-m
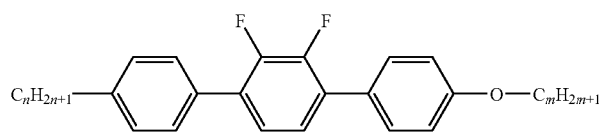
PYP-n-Om
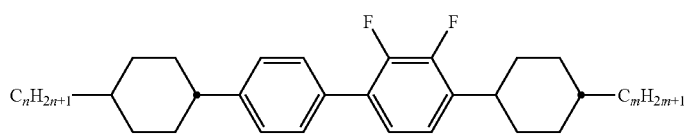
CPYC-n-m TABLE D-continued
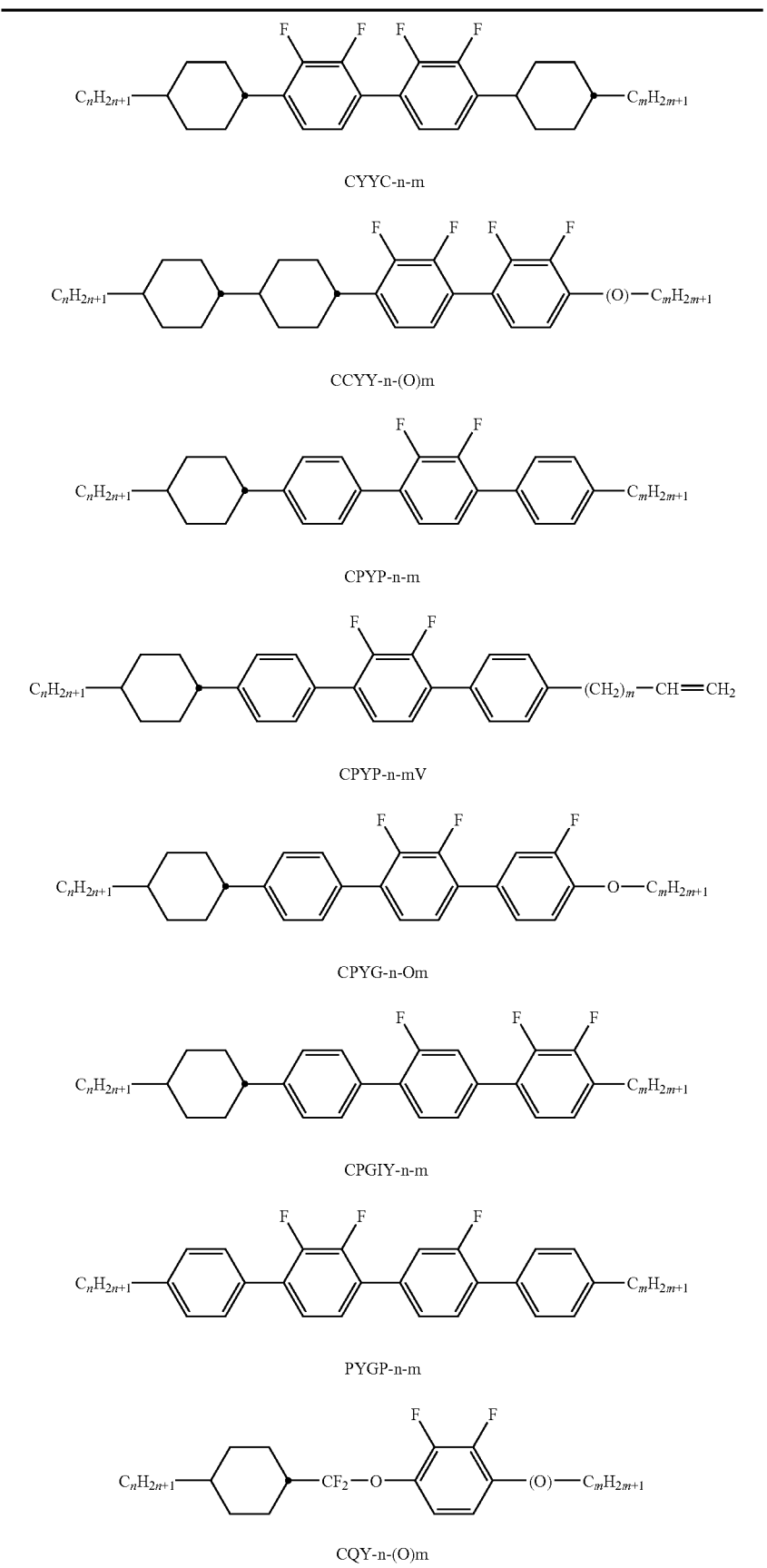

TABLE D-continued
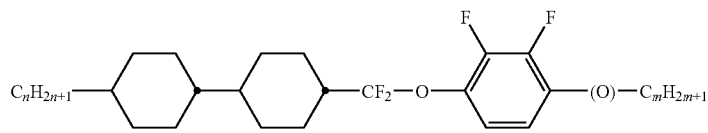
CCQY-n-(O)m
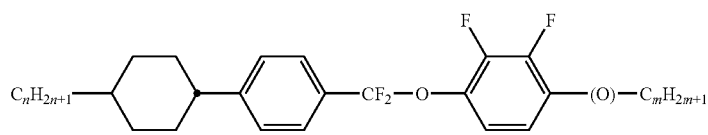
CPQY-n-(O)m
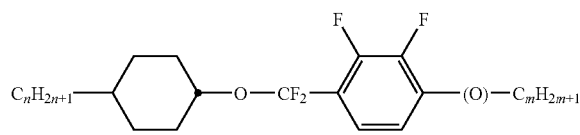
CQIY-n-(O)m
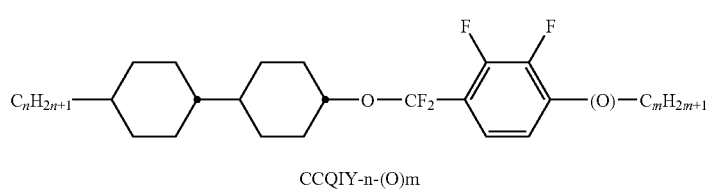
CCQIY-n-(O)m
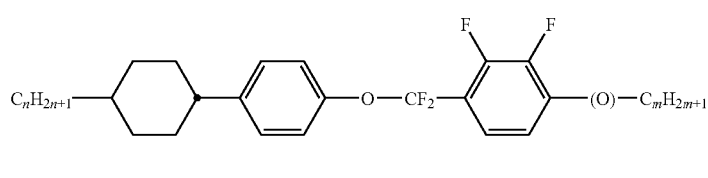
CPQIY-n-(O)m
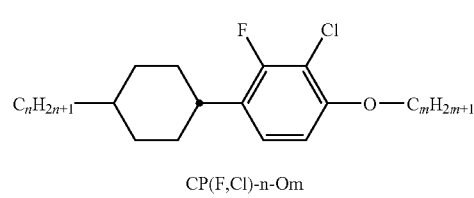
CP(F,Cl)-n-Om
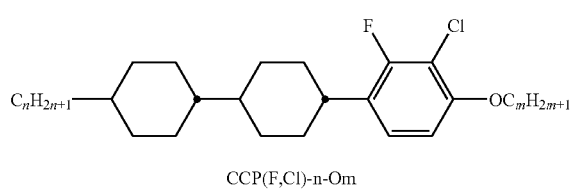
CCP(F,Cl)-n-Om
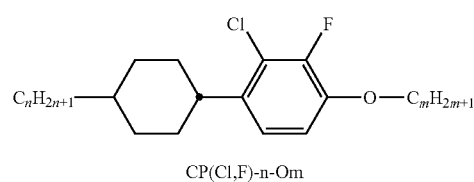
CP(Cl,F)-n-Om TABLE D-continued
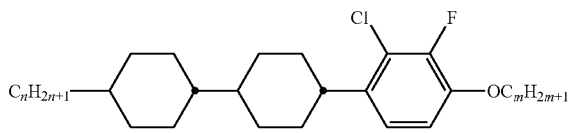
CCP(Cl,F)-n-Om
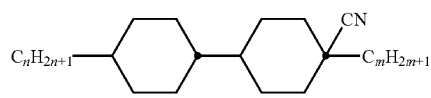
CN-n-m
CNC-n-m
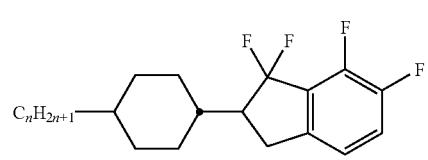
CK-n-F
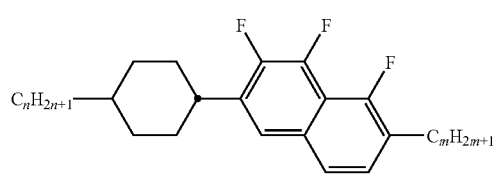
CN3f-n-m
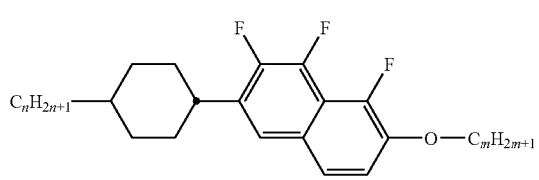
CN3f-n-Om
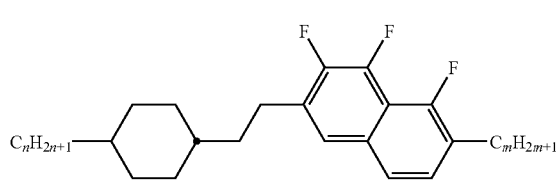
CEN3f-n-m
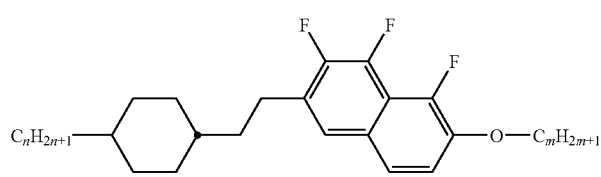
CEN3f-n-Om TABLE D-continued
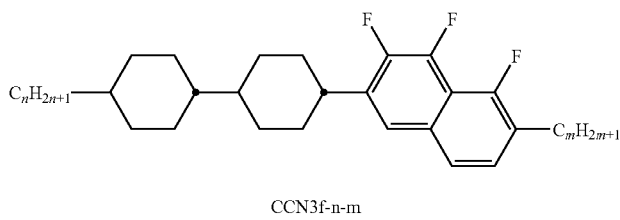
CCN3f-n-m
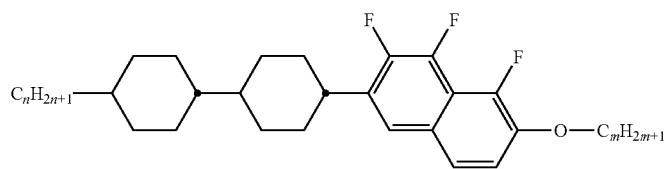
CCN3f-n-Om
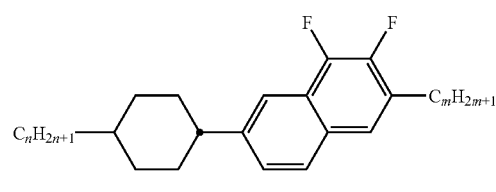
CN2f-n-m
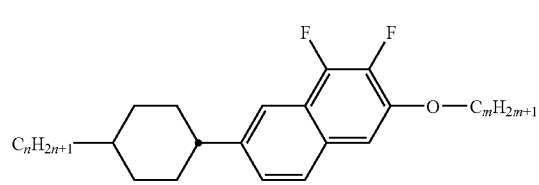
CN2f-n-Om
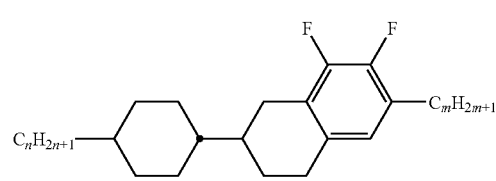
CT2f-n-m
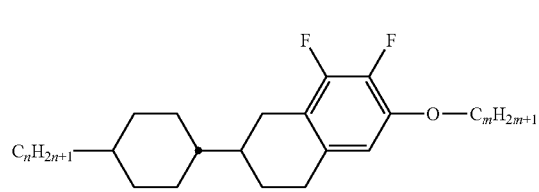
CT2f-n-Om
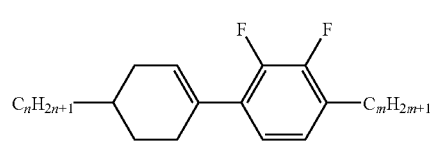
LY-n-m TABLE D-continued
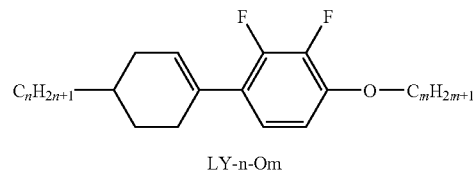
LY-n-Om
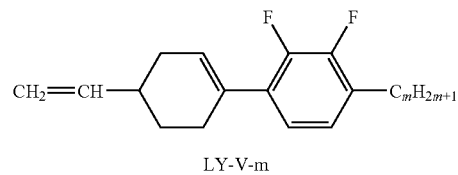
LY-V-m
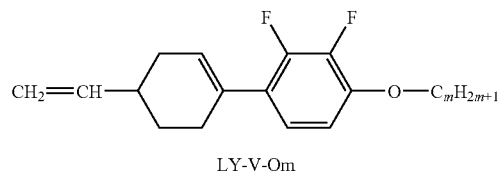
LY-V-Om
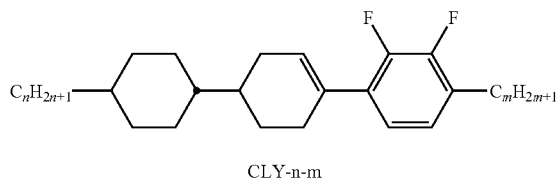
CLY-n-m
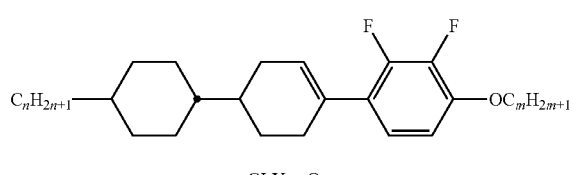
CLY-n-Om
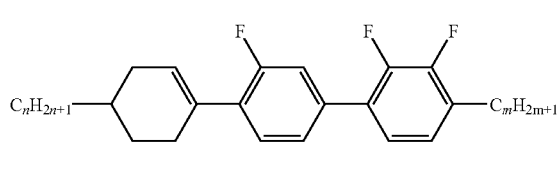
LGIY-n-m
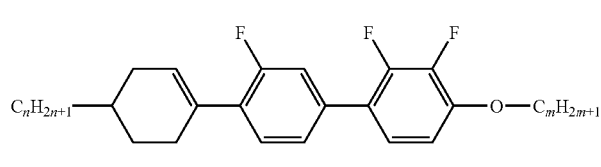
LGIY-n-Om
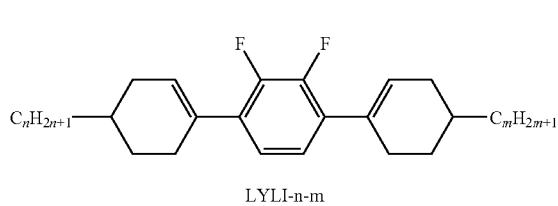
LYLI-n-m Table E shows chiral dopants which are preferably employed in the mixtures according to the invention.
TABLE E
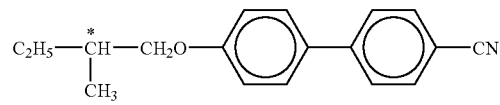
C 15
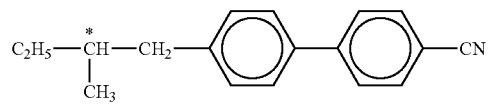
CB 15
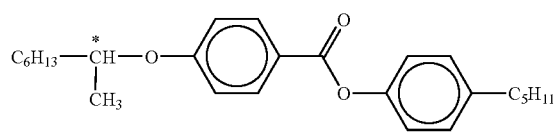
CM 21
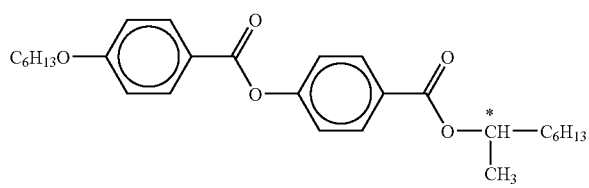
R S-811/S-811
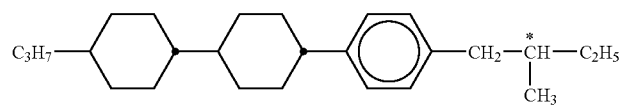
CM 44
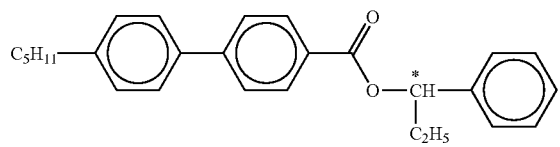
CM 45
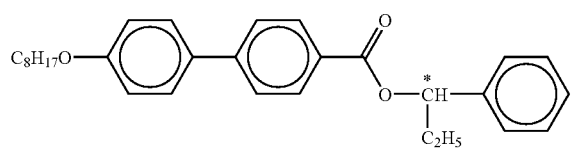
CM 47

TABLE E-continued
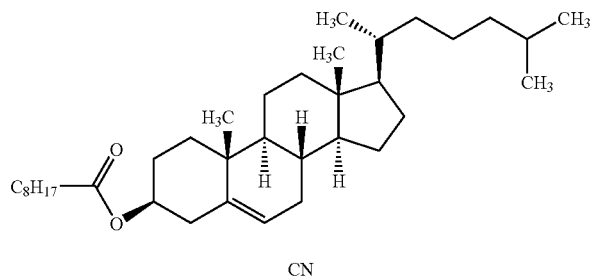
CN
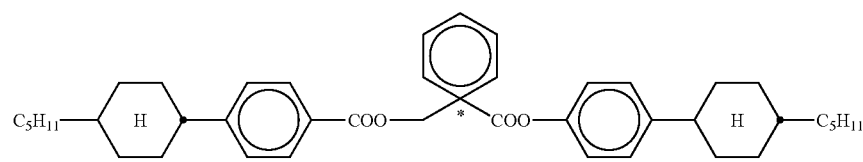
R-1011/S-1011
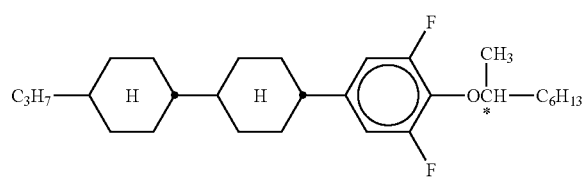
R-2011/S-2011
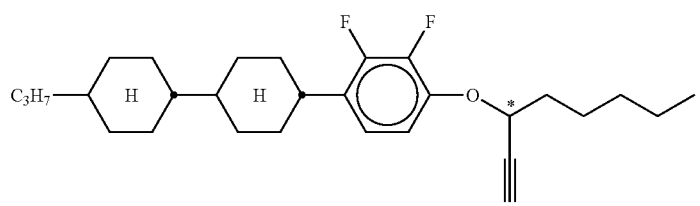
R-3011/S-3011
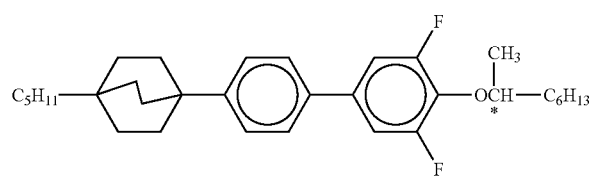
R-4011/S-4011
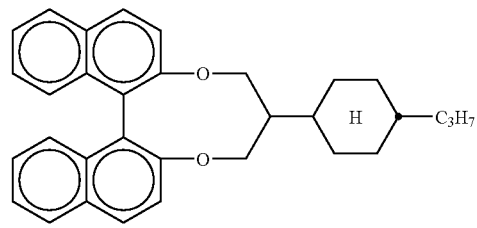
R-5011/S-5011

In a preferred embodiment of the present invention, the media according to the invention comprise one or more compounds selected from the group of the compounds from Table E.
TABLE F
(n here denotes an integer from 1 to 12)
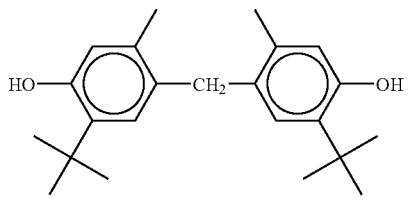
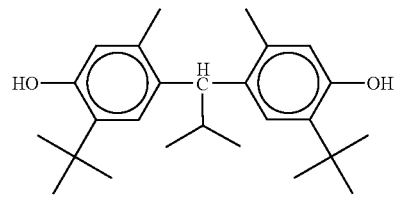
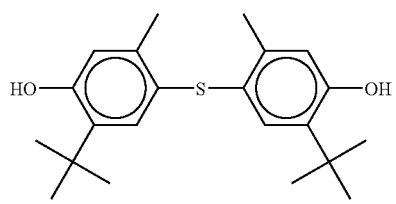
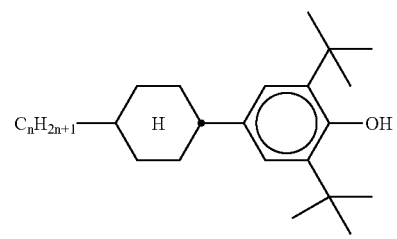
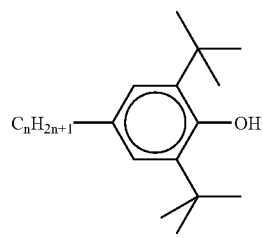
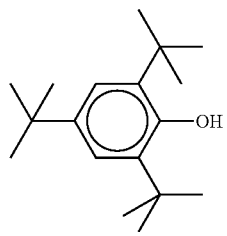
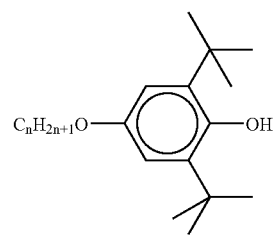
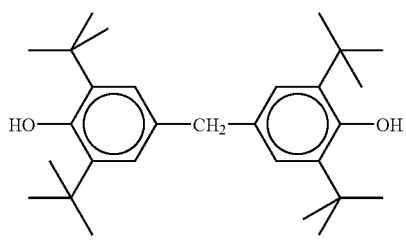
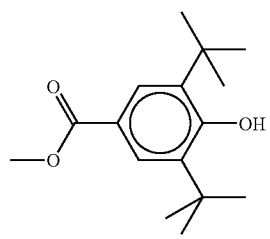
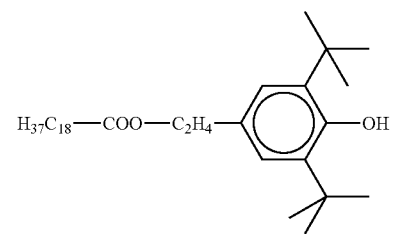
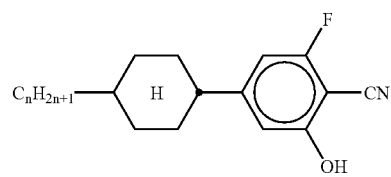
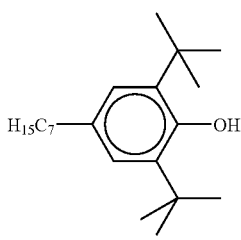

TABLE F-continued
(n here denotes an integer from 1 to 12)
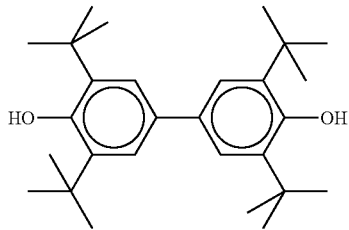
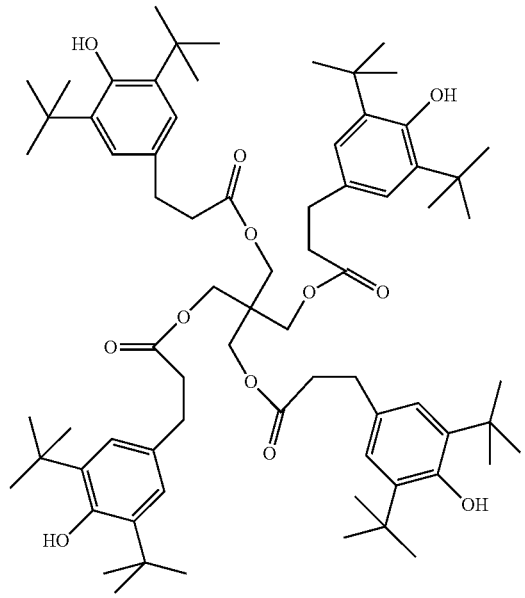
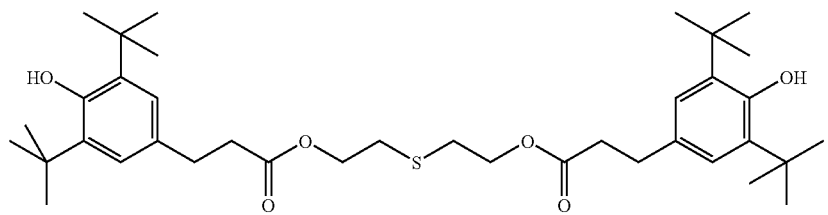
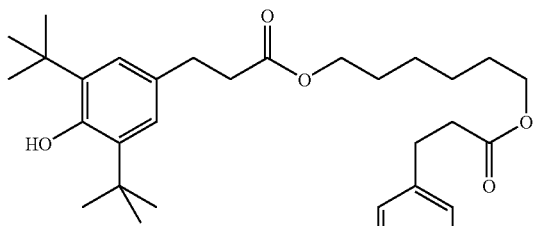
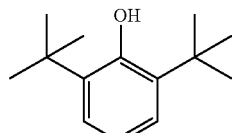
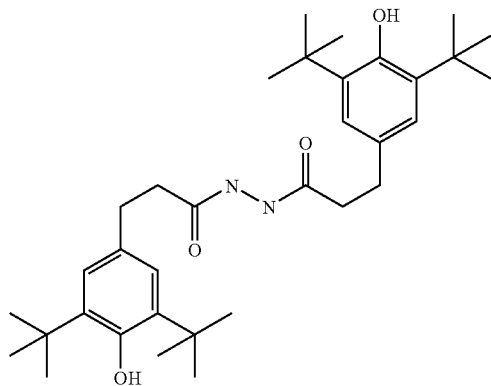

TABLE F-continued
(n here denotes an integer from 1 to 12)
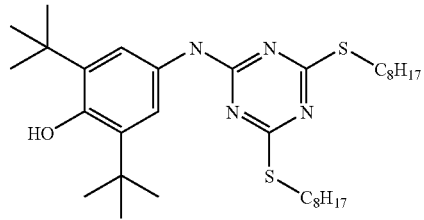
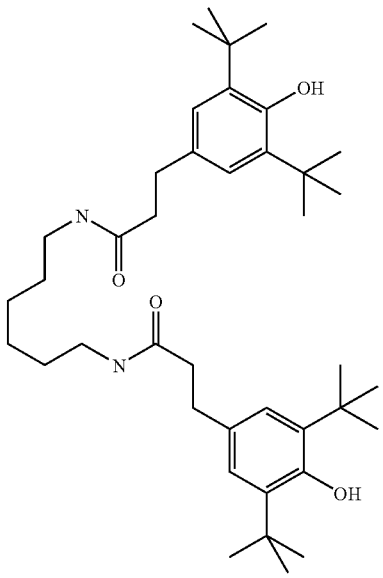
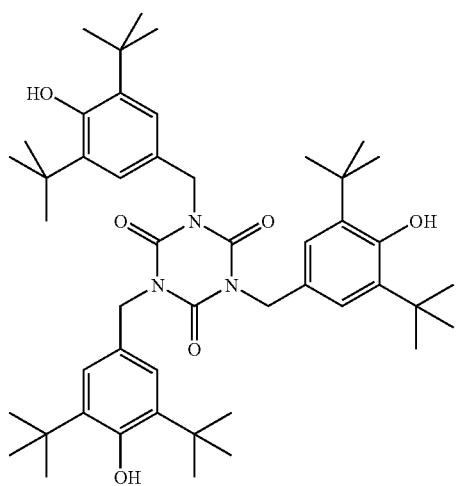
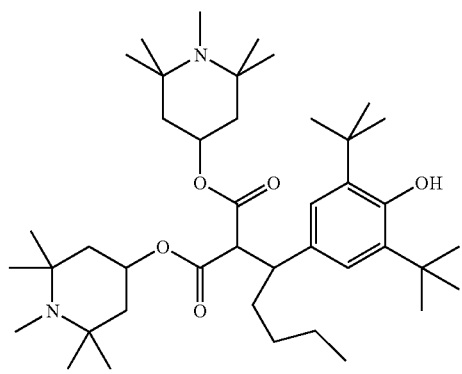
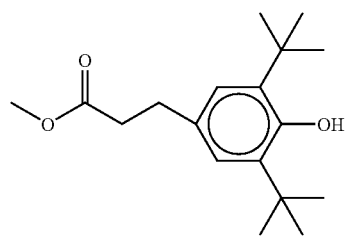
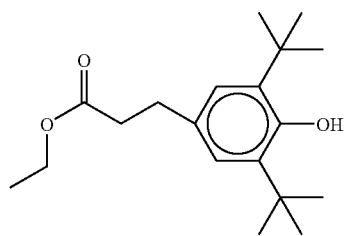
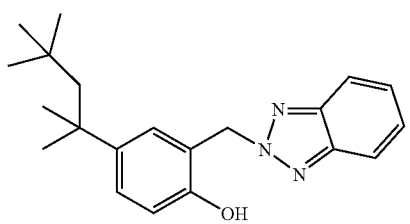

TABLE F-continued
(n here denotes an integer from 1 to 12)
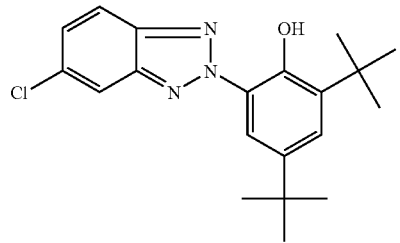
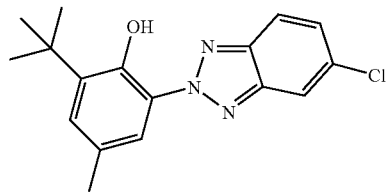
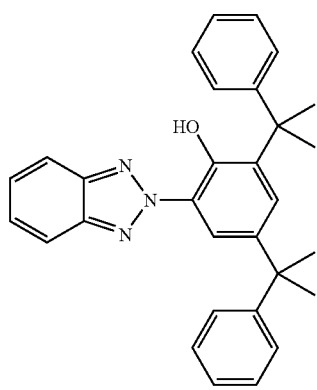
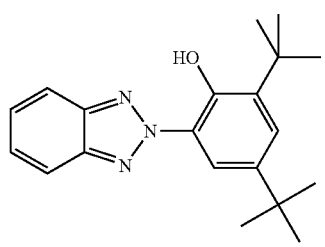
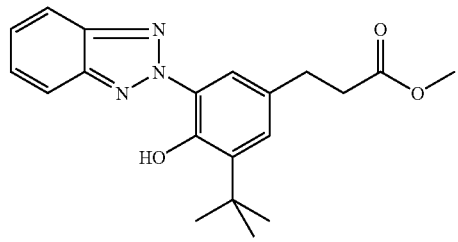
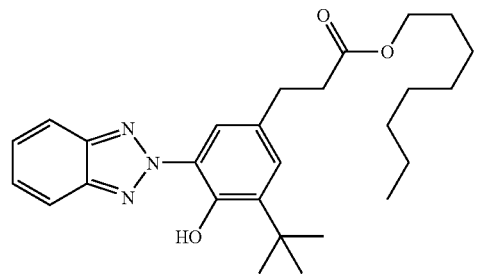
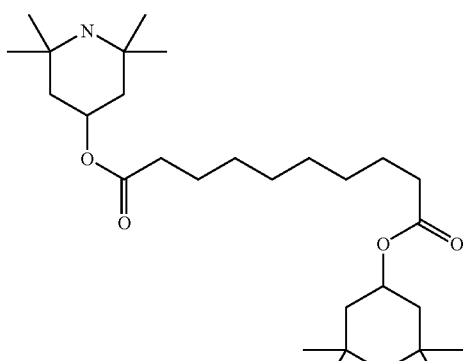
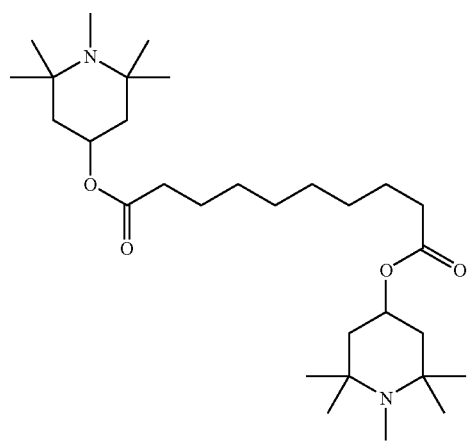

TABLE F-continued (n here denotes an integer from 1 to 12)

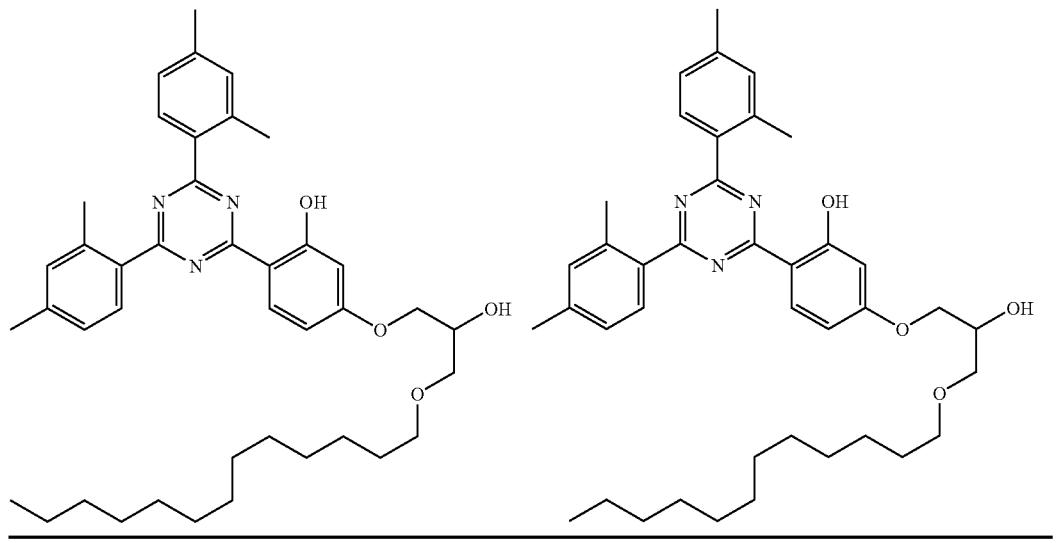

In a preferred embodiment of the present invention, the media according to the invention comprise one or more compounds selected from the group of the compounds from Table F.

MIXTURE EXAMPLES

Example 1

| | Composition | | |
|---|---|---|---|
| | Compound | | |
| No. | Abbr. | Concentration % | Physical properties |
| 1 | CLY-2-O4 | 4.0 | T (N, I) = 80.0° C. |
| 2 | CLY-3-O2 | 5.0 | $n_e$ (20° C., 589 nm) = 1.6011 |
| 3 | CLY-3-O3 | 3.0 | $\Delta n$ (20° C., 589 nm) = 0.1203 |
| 4 | CY-3-O2 | 15.0 | $\epsilon_\perp$ (20° C., 1 kHz) = 12.3 |
| 5 | CY-3-O4 | 20.0 | $\Delta\epsilon$ (20° C., 1 kHz) = −7.7 |
| 6 | CY-5-O2 | 13.0 | $K_1$ (20° C.) = 14.1 pN |
| 7 | CCY-3-O2 | 6.0 | $K_3/K_1$ (20° C.) = 16.2 pN |
| 8 | CCY-4-O2 | 6.0 | $V_0$ (20° C.) = 1.53 V |
| 9 | CCY-5-O2 | 4.0 | |
| 10 | CPY-2-O2 | 9.0 | |
| 11 | CPY-3-O2 | 9.0 | |
| 12 | PTY-3-O2 | 1.5 | |
| 13 | CPTY-3-O2 | 2.5 | |
| 14 | CPTY-5-O2 | 2.0 | |
| Σ | | 100.0 | |

This mixture is well suited for VA-PM displays.

Example 2

| | Composition | | |
|---|---|---|---|
| | Compound | | |
| No. | Abbr. | Concentration % | Physical properties |
| 1 | CLY-2-O4 | 4.0 | T (N, I) = 81.0° C. |
| 2 | CLY-3-O2 | 4.0 | $n_e$ (20° C., 589 nm) = 1.6126 |
| 3 | CLY-3-O3 | 3.0 | $\Delta n$ (20° C., 589 nm) = 0.1298 |
| 4 | CY-3-O2 | 15.0 | $\epsilon_\perp$ (20° C., 1 kHz) = 12.3 |
| 5 | CY-3-O4 | 20.0 | $\Delta\epsilon$ (20° C., 1 kHz) = −7.7 |
| 6 | CY-5-O2 | 7.0 | $K_1$ (20° C.) = 14.1 pN |
| 7 | CCY-3-O2 | 4.0 | $K_3$ (20° C.) = 16.6 pN |
| 8 | CCY-3-O3 | 3.0 | $V_0$ (20° C.) = 1.55 V |
| 9 | CCY-4-O2 | 4.0 | |
| 10 | CCY-5-O2 | 6.0 | |
| 11 | CPY-2-O2 | 10.0 | |
| 12 | CPY-3-O2 | 10.0 | |
| 13 | PTY-3-O2 | 4.0 | |
| 14 | PTY-5-O2 | 4.0 | |
| 15 | CPTY-3-O2 | 2.0 | |
| Σ | | 100.0 | |

This mixture is well suited for VA-PM displays.

Example 3

| | Composition | | |
|---|---|---|---|
| | Compound | | |
| No. | Abbr. | Concentration % | Physical properties |
| 1 | CLY-2-O4 | 4.0 | T (N, I) = 80.5° C. |
| 2 | CLY-3-O2 | 5.0 | $n_e$ (20° C., 589 nm) = 1.6234 |
| 3 | CLY-3-O3 | 3.0 | $\Delta n$ (20° C., 589 nm) = 0.1403 |
| 4 | CY-3-O2 | 15.0 | $\epsilon_\perp$ (20° C., 1 kHz) = 12.2 |
| 5 | CY-3-O4 | 20.0 | $\Delta\epsilon$ (20° C., 1 kHz) = −7.6 |
| 6 | CY-5-O2 | 7.5 | $K_1$ (20° C.) = 14.1 pN |

83
-continued

Composition

| Compound | | | |
|---|---|---|---|
| No. | Abbr. | Concentration % | Physical properties |
| 7 | CCY-3-O2 | 4.0 | $K_3$ (20° C.) = 17.2 pN |
| 8 | CCY-4-O2 | 4.0 | $V_0$ (20° C.) = 1.58 V |
| 9 | CCY-5-O2 | 2.0 | |
| 10 | CPY-2-O2 | 10.0 | |
| 11 | CPY-3-O2 | 10.0 | |
| 12 | PTY-3-O2 | 4.5 | |
| 13 | PTY-5-O2 | 5.0 | |
| 14 | CPTY-3-O2 | 3.0 | |
| 15 | CPTY-5-O2 | 3.0 | |
| Σ | | 100.0 | |

This mixture is well suited for VA-PM displays.

Example 4

Composition

| Compound | | | |
|---|---|---|---|
| No. | Abbr. | Concentration % | Physical properties |
| 1 | CLY-2-O4 | 4.0 | T (N, I) = 80.5° C. |
| 2 | CLY-3-O2 | 4.0 | $n_e$ (20° C., 589 nm) = 1.6371 |
| 3 | CLY-3-O3 | 4.0 | Δn (20° C., 589 nm) = 0.1517 |
| 4 | CY-3-O2 | 15.0 | $\epsilon_\perp$ (20° C., 1 kHz) = 12.2 |
| 5 | CY-3-O4 | 18.0 | Δε (20° C., 1 kHz) = −7.5 |
| 6 | CY-5-O2 | 8.0 | $K_1$ (20° C.) = 14.4 pN |
| 7 | CCY-5-O2 | 3.0 | $K_3$ (20° C.) = 17.5 pN |
| 8 | CPY-2-O2 | 12.0 | $V_0$ (20° C.) = 1.61 V |
| 9 | CPY-3-O2 | 12.0 | |
| 10 | PTY-3-O2 | 6.0 | |
| 11 | PTY-5-O2 | 6.0 | |
| 12 | CPTY-3-O2 | 4.0 | |
| 13 | CPTY-5-O2 | 4.0 | |
| Σ | | 100.0 | |

This mixture is well suited for VA-PM displays.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure[s] of all applications, patents and publications, cited herein and of corresponding EP 08018955.8, filed Oct. 30, 2009, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium based on a mixture of dielectrically negative polar compounds, comprising one or more compounds of formula I

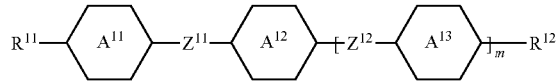

in which $R^{11}$ and $R^{12}$ each independently of one another denote H, an unsubstituted alkyl or alkenyl radical having up to 15 C atoms in which one or more $CH_2$ groups may be replaced by —O—, —S—,

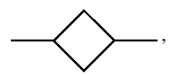

—C≡C—, —$CF_2$—O—, —O—$CF_2$—, —CO—O— or —O—CO— in such a way that O atoms are not linked directly to one another, one of the rings

which is present, denotes

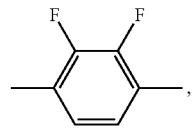

and another one of these rings, which is present, denotes

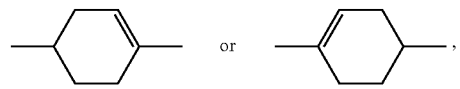

and the last one, if present, independently of the others, denotes

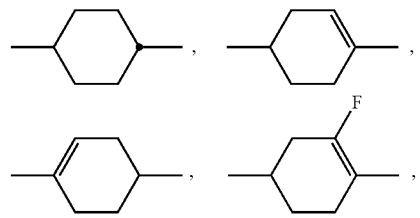

-continued

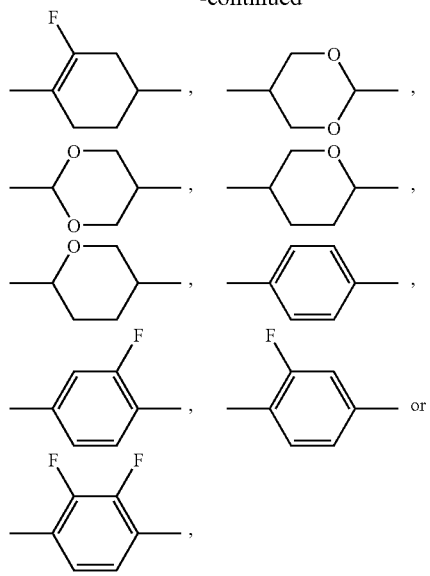

$Z^{11}$ and $Z^{12}$ each independently of one another denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, and m denotes 0 or 1, and one or more compounds of the formula II

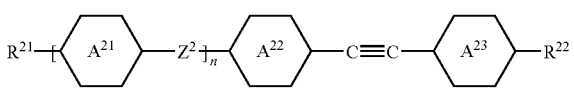

II in which $R^{21}$ and R22 each independently of one another denote H, an unsubstituted alkyl or alkenyl radical having up to 15 C atoms in which one or more CH$_2$ groups may be replaced by —O—, —S—,

—C≡C—, —CF$_2$—O—, —O—CF$_2$—, —CO—O— or —O—CO— in such a way that O atoms are not linked directly to one another,

denotes

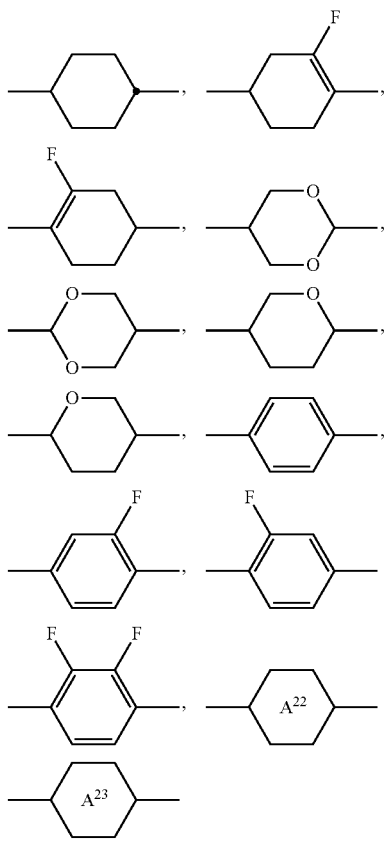

independently of one another denote

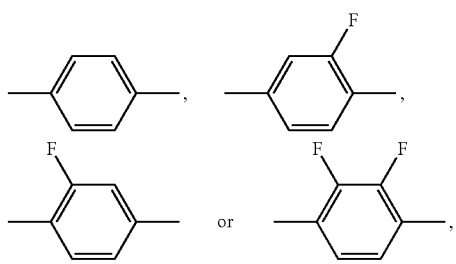

$Z^2$ denotes —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$—or a single bond, and n denotes 0 or 1.

2. A medium according to claim 1, further comprising one or more dielectrically negative compounds of formula III

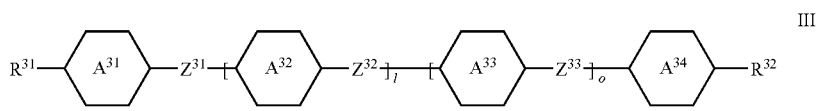

III in which

R$^{31}$ and R$^{32}$ each independently of one another denote H, an unsubstituted alkyl or alkenyl radical having up to 15 C atoms in which one or more CH$_2$ groups may be replaced by —O—, —S—,

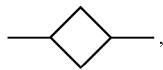

—C≡C—, —CF$_2$—O—, —O—CF$_2$—, —CO—O— or —O—CO— in such a way that O atoms are not linked directly to one another, one of the rings

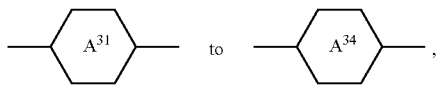 to which is present, denotes

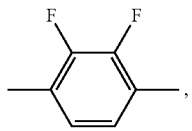

and the others, if present, each independently of one another denote

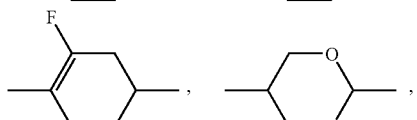

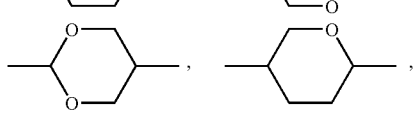

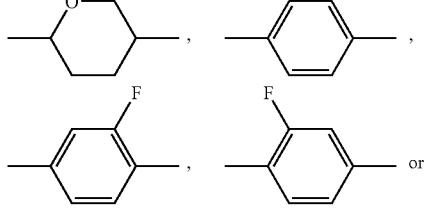 or

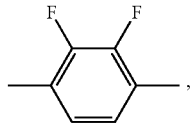

Z$^{31}$ to Z$^{33}$ each independently of one another denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, and l and o each independently of one another denote 0 or 1.

3. A medium according to claim 1, further comprising one or more dielectrically neutral compounds of formula IV

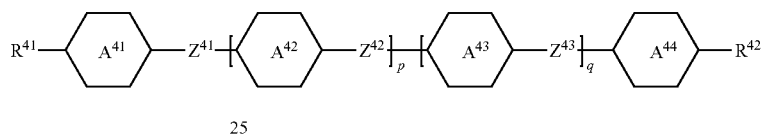

IV in which

R$^{41}$ and R$^{42}$ each independently of one another denote H, an unsubstituted alkyl or alkenyl radical having up to 15 C atoms in which one or more CH$_2$ groups may be replaced by —O—, —S—,

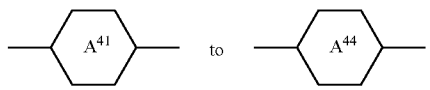

—C≡C—, —CF$_2$—O—, —O—CF$_2$—, —CO—O— or —O—CO— in such a way that O atoms are not linked directly to one another,

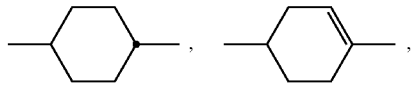 to each independently of one another denote

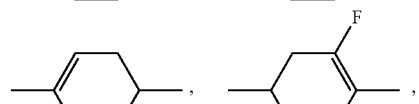

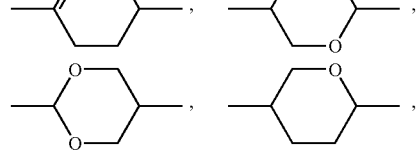

-continued

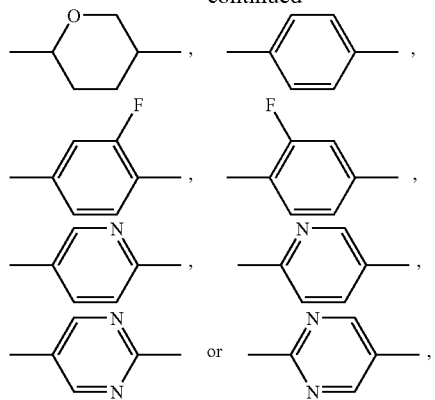

or $Z^{41}$ to Z43 each independently of one another denote —CH$_2$—CH$_2$—, —CH═CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, and p and q each independently of one another denote 0 or 1.

4. A medium according to claim 1, further comprising one or more dielectrically negative compounds of formula V or VI

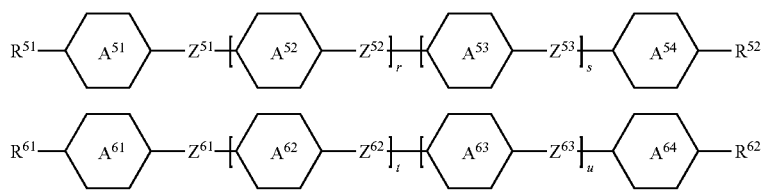

in which $R^{51}$, $R^{52}$, $R^{61}$ and $R^{62}$ each independently of one another denote H, an unsubstituted alkyl or alkenyl radical having up to 15 C atoms in which one or more CH$_2$ groups may be replaced by —O—, —S—,

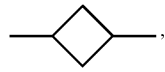

—C≡C—, —CF$_2$—O—, —O—CF$_2$—, —CO—O— or —O—CO— in such a way that O atoms are not linked directly to one another, one of the rings

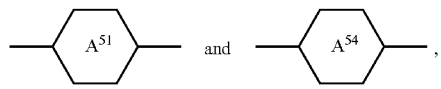

which is present, denotes

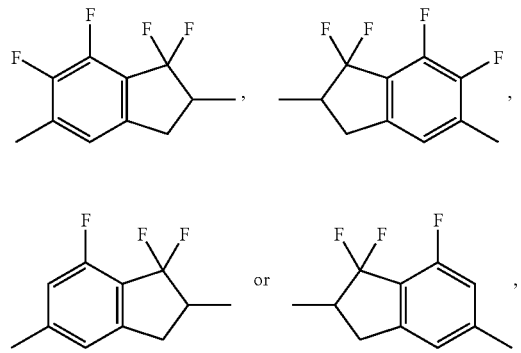

and the other rings

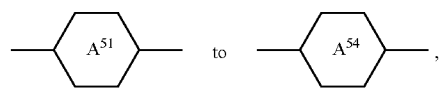

if present, each independently of one another denote

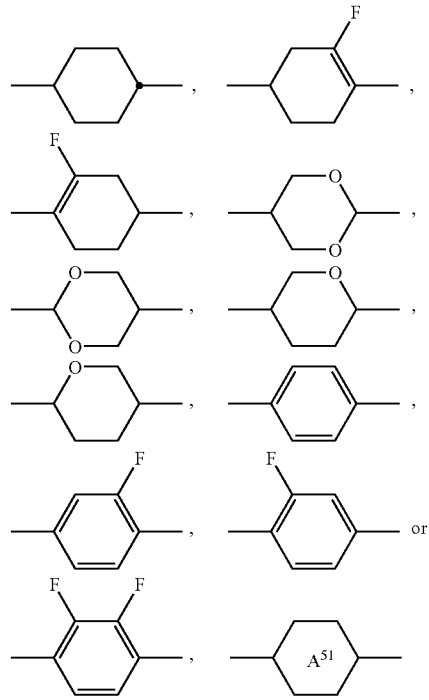

alternatively also may denote a single bond, one of the rings

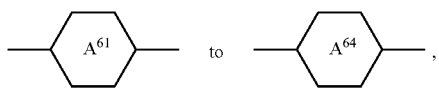 to , which is present, denotes

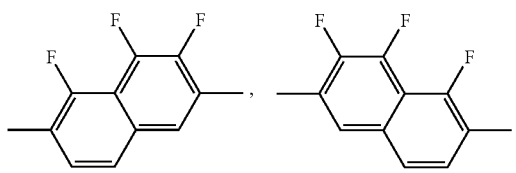
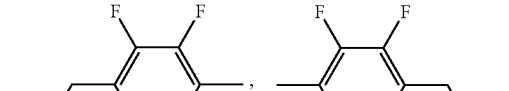
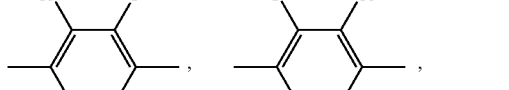
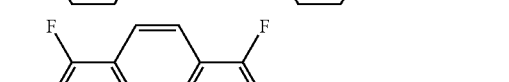
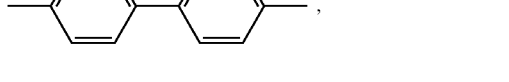
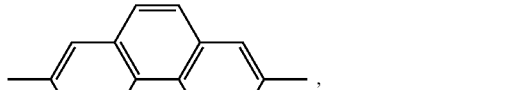
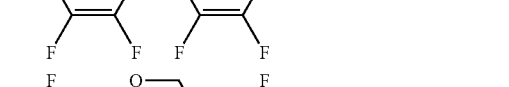
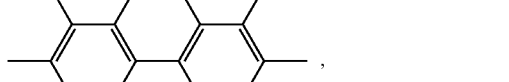
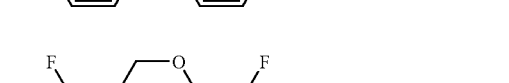
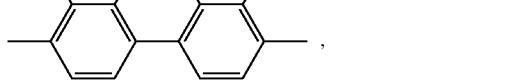

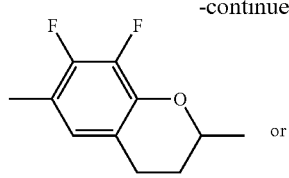 or

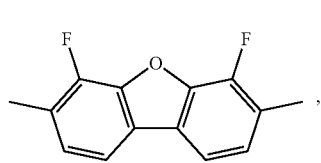, and the others, if present, each independently of one another, denote

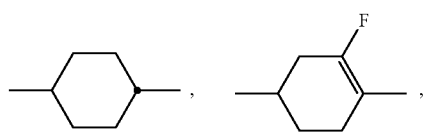
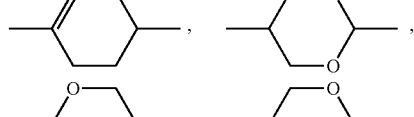
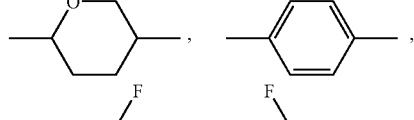
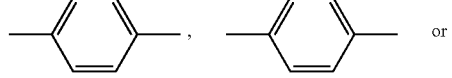
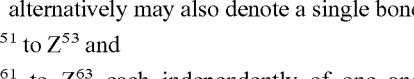 or
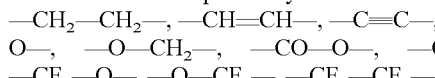

alternatively may also denote a single bond, $Z^{51}$ to $Z^{53}$ and $Z^{61}$ to $Z^{63}$ each independently of one another denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, r and s each independently of one another denote 0 or 1, and t and u each independently of one another denote 0 or 1.

5. A medium according to claim 1, comprising two or more compounds of formula I.

6. A medium according to claim 1, in which the concentration of the compounds of formula I as a whole is 10% or more.

7. A medium according to claim 1, which comprises one or more compounds of formula II-1 or II-2

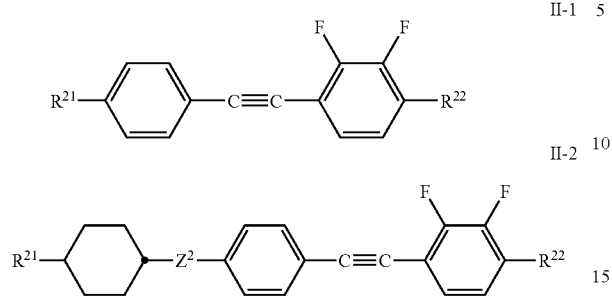

$R^{21}$ and $R^{22}$ each independently of one another denote H, an unsubstituted alkyl or alkenyl radical having up to 15 C atoms in which one or more CH$_2$ groups may be replaced by —O—, —S—,

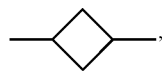

—C≡C—, —CF$_2$—O—, —O—CF$_2$—, —CO—O— or —O—CO— in such a way that O atoms are not linked directly to one another, and $Z^2$ denotes —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond.

8. A medium according to claim 7, wherein in a compound of formula II-1 or II-2

$R^{21}$ denotes alkyl, $R^{22}$ denotes alkoxy, and $Z^2$ denotes —CO—O—, —CH$_2$—CH$_2$— or a single bond.

9. A medium according to claim 7, in which the concentration of the compounds of formulae II-1 or II-2 as a whole is 5% or more.

10. A medium according to claim 1, which comprises one or more compounds of formula IA'-1 or IB'-1

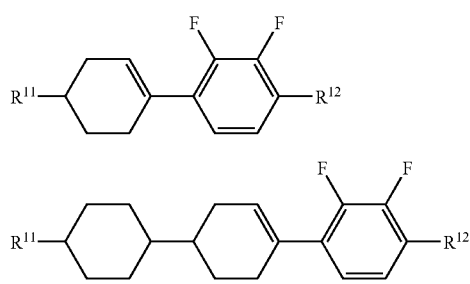

wherein $R^{21}$ and $R^{22}$ each independently of one another denote H, an unsubstituted alkyl or alkenyl radical having up to 15 C atoms in which one or more CH$_2$ groups may be replaced by —O—, —S—,

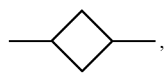

—C≡C—, —CF$_2$—O—, —O—CF$_2$—, —CO—O— or —O—CO— in such a way that O atoms are not linked directly to one another.

11. A medium according to claim 2, in which comprises
2% to 30% by weight of one or more compounds of formula I,
2% to 40% by weight of one or more compounds of formula II, and
50% to 96% by weight of one or more compounds of formula III,
where the total content of all compounds of formulae I to III in the medium is 100% or less.

12. An electro-optical display, which contains, as dielectric, a liquid-crystalline medium according to claim 1.

13. A display according to claim 12, which is addressable by a passive matrix.

14. A display according to claim 12, which is based on a VA, ECB, PALC, FFS or IPS effect.

15. A medium according to claim 2, which comprises one or more compounds of formulae CLY-n-Om, CY-n-Om, CCY-n-Om, and/or CPY-n-Om, and one or more compounds of formulae PTY-n-(O)m and/or CPTY-n-(O)m

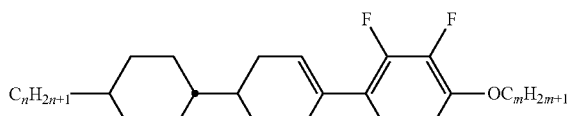
CLY-n-Om

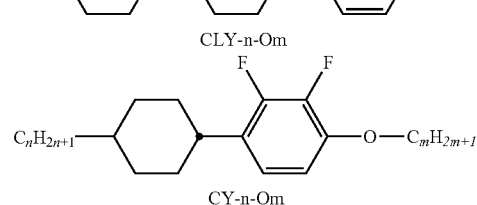
CY-n-Om

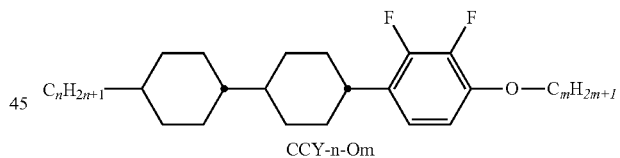
CCY-n-Om

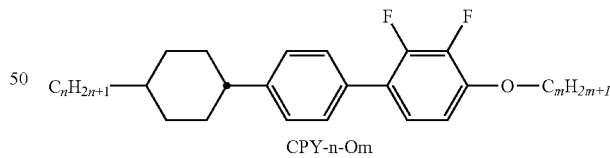
CPY-n-Om

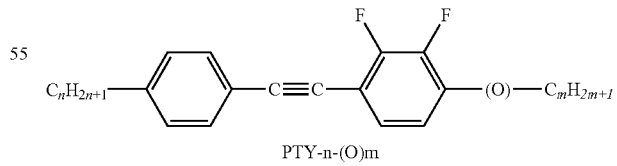
PTY-n-(O)m

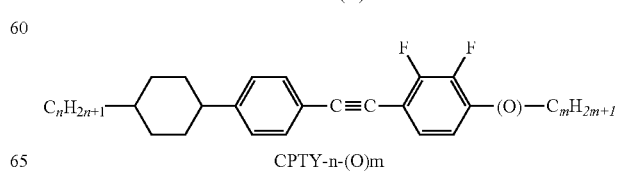
CPTY-n-(O)m wherein
n and m are, independently of each other, integers from 1 to 7.

16. A medium according to claim 15, wherein n and m are, independently of each other, integers from 1 to 5.

17. A medium according to claim 2, which comprises one or more compounds of formulae CLY-n-Om, CY-n-Om, CCY-n-Om, CPY-n-Om, PTY-n-(O)m and CPTY-n-(O)m

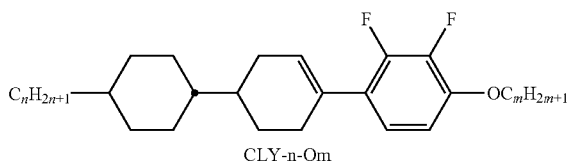
CLY-n-Om

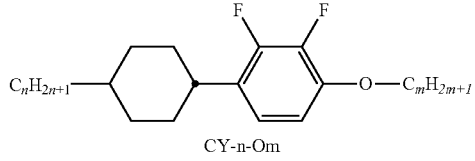
CY-n-Om

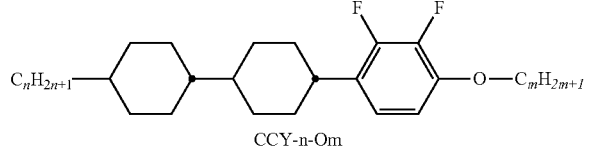
CCY-n-Om

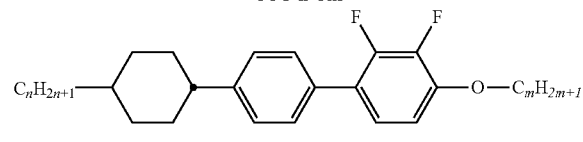
CPY-n-Om

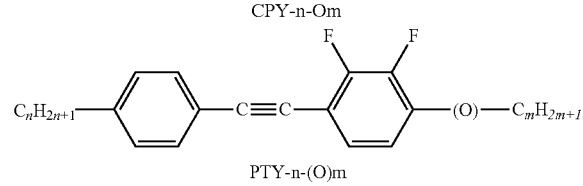
PTY-n-(O)m

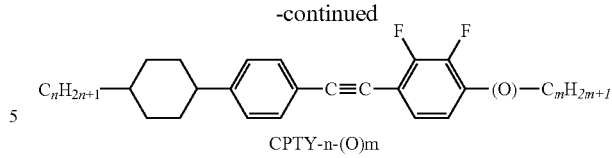
CPTY-n-(O)m wherein
n and m are, independently of each other, integers from 1 to 7.

18. A medium according to claim 17, wherein n and, m are, independently of each other, integers from 1 to 5.

19. A medium according to claim 1, which comprises one or more compounds of formulae PTY-n-(O)m and/or CPTY-n-(O)m

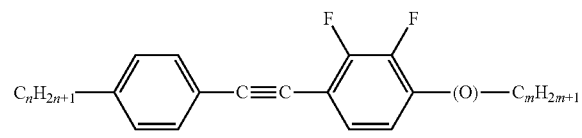
PTY-n-(O)m

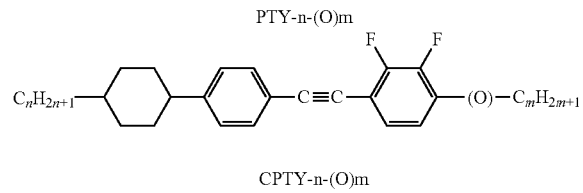
CPTY-n-(O)m wherein
n and m are, independently of each other, integers from 1 to 7.

20. A medium according to claim 19, wherein n and, m are, independently of each other, integers from 1 to 5.

* * * * *